(12) United States Patent
Zonneveld et al.

(10) Patent No.: US 9,927,055 B2
(45) Date of Patent: Mar. 27, 2018

(54) COUPLING WITH COMPONENTS WHICH PREVENT INTERCHANGEABILITY

(71) Applicants: Edwin John William Zonneveld, Fort Langley (CA); Kelly Maxwell Stead, Maple Ridge (CA)

(72) Inventors: Edwin John William Zonneveld, Fort Langley (CA); Kelly Maxwell Stead, Maple Ridge (CA)

( * ) Notice: Subject to any disclaimer, the term of this patent is extended or adjusted under 35 U.S.C. 154(b) by 124 days.

(21) Appl. No.: 15/049,061

(22) Filed: Feb. 20, 2016

(65) Prior Publication Data

US 2016/0245443 A1 Aug. 25, 2016

Related U.S. Application Data

(60) Provisional application No. 62/119,217, filed on Feb. 22, 2015.

(51) Int. Cl.
*F16L 25/08* (2006.01)
*F16L 37/18* (2006.01)

(52) U.S. Cl.
CPC ........... *F16L 37/18* (2013.01); *F16L 2201/10* (2013.01); *F16L 2201/60* (2013.01); *Y10T 29/4978* (2015.01)

(58) Field of Classification Search
CPC ... F16L 37/18; F16L 2201/60; F16L 2201/10; Y10T 29/4978

USPC ................ 285/93, 311, 312; 29/407.1, 407.9
See application file for complete search history.

(56) References Cited

U.S. PATENT DOCUMENTS

| | | | | |
|---|---|---|---|---|
| 455,202 | A * | 6/1891 | Hampton | 285/312 X |
| 949,608 | A * | 2/1910 | Watt | 285/312 |
| 1,154,984 | A * | 9/1915 | Forth | F16L 27/06 |
| | | | | 285/312 X |
| 2,518,026 | A | 8/1950 | Krapp | |
| 3,625,548 | A * | 12/1971 | Boehm | F16L 37/20 |
| | | | | 285/311 X |
| 2014/0183860 | A1 | 7/2014 | Stead | |
| 2015/0240977 | A1 | 8/2015 | Zonneveld | |

FOREIGN PATENT DOCUMENTS

CA 2800795 3/2013

* cited by examiner

*Primary Examiner* — Gregory J Binda

(57) ABSTRACT

A quick-disconnect coupling such as a camlock includes a male plug and a female socket defining a duct for communication of a fluid with a locking arrangement for locking the male plug in the female socket. Protrusions are provided on an outside surface of the female socket or on an outside surface of the male plug and corresponding recesses are provided on an outside surface of the male plug or on an outside surface of a female socket with the recesses and protrusions beings cooperatively shaped and arranged to allow insertion of the male plug member into the female socket member to the locking position only when the recesses and protrusions match.

22 Claims, 18 Drawing Sheets

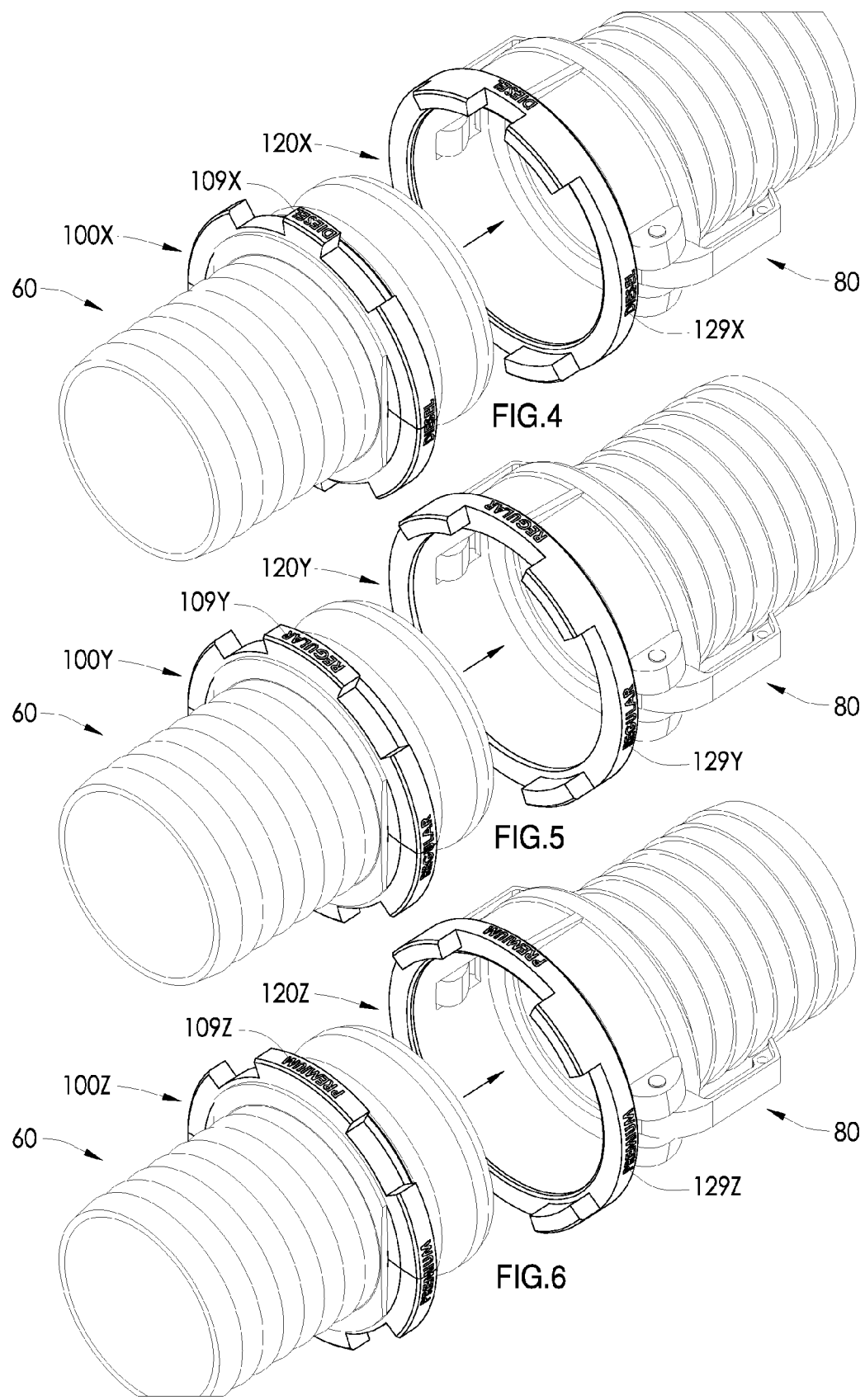

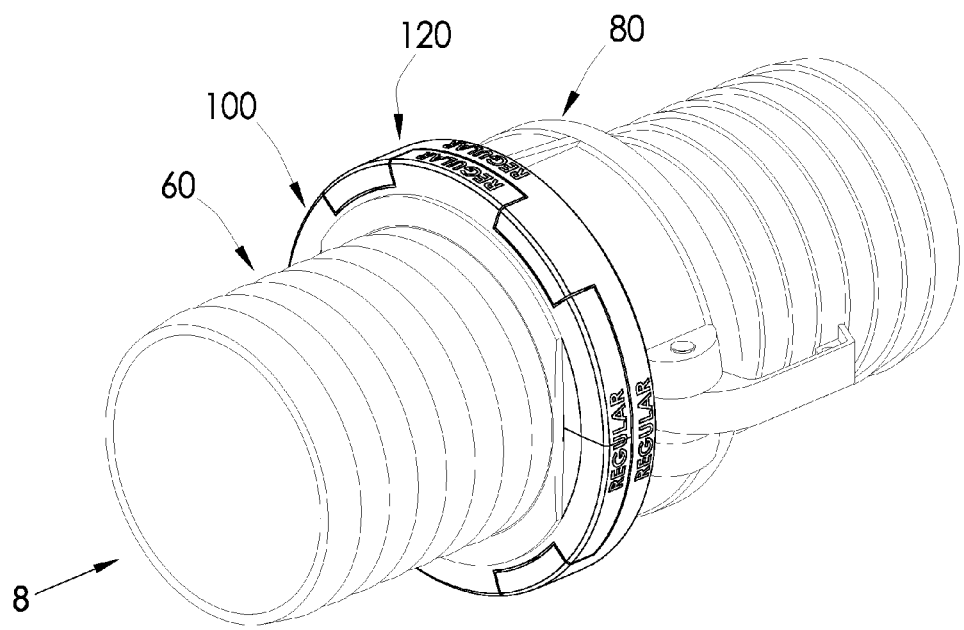
FIG.7
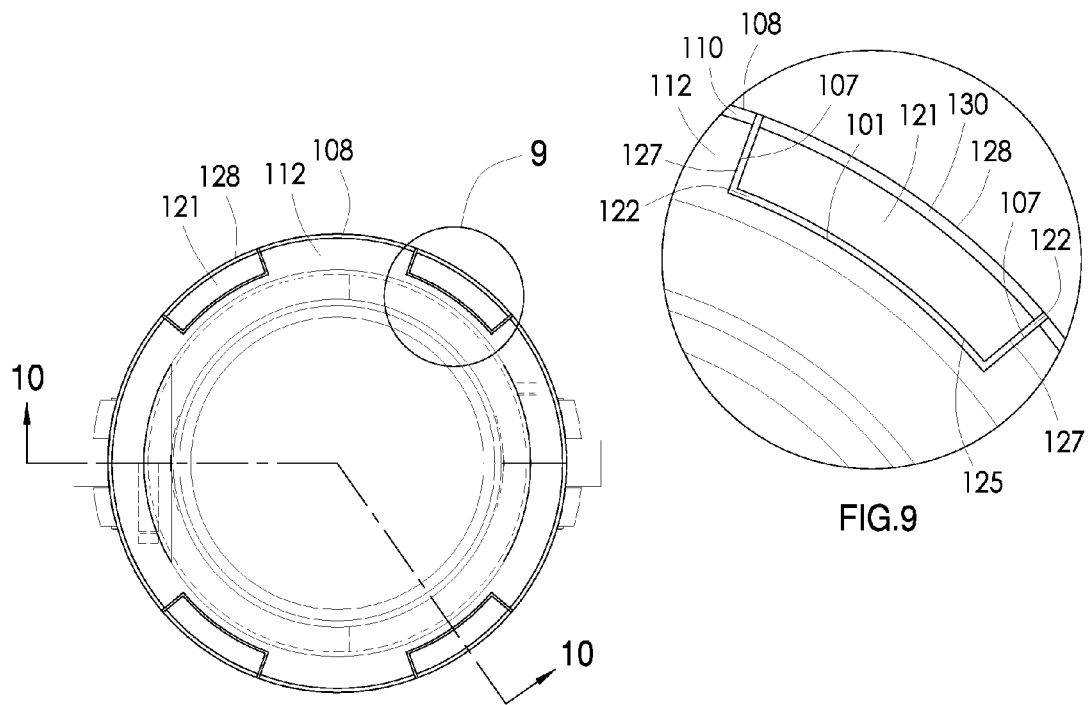
FIG.8
FIG.9

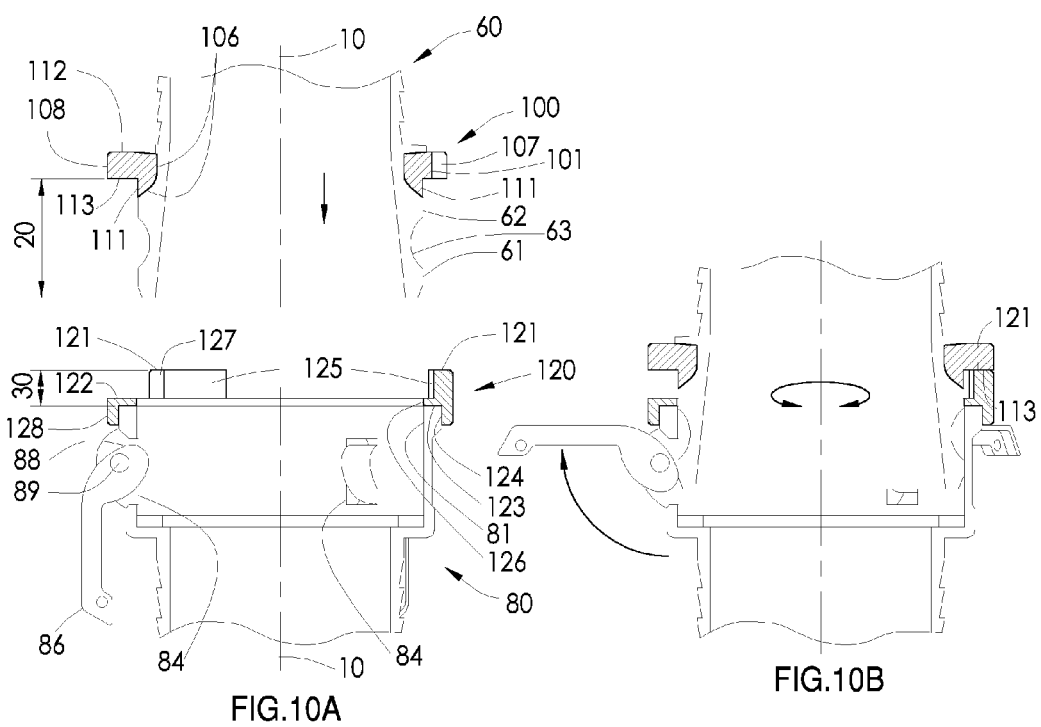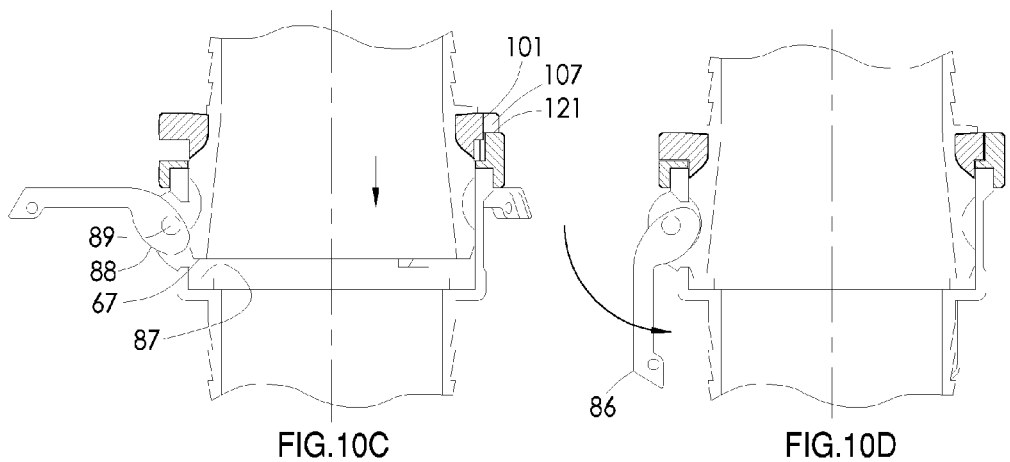

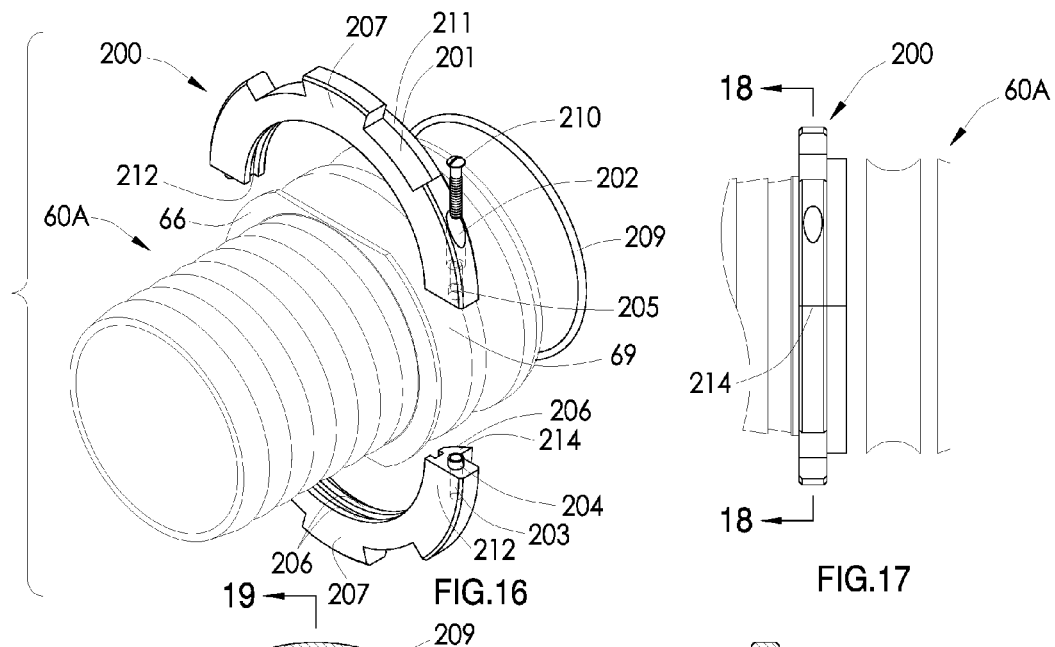
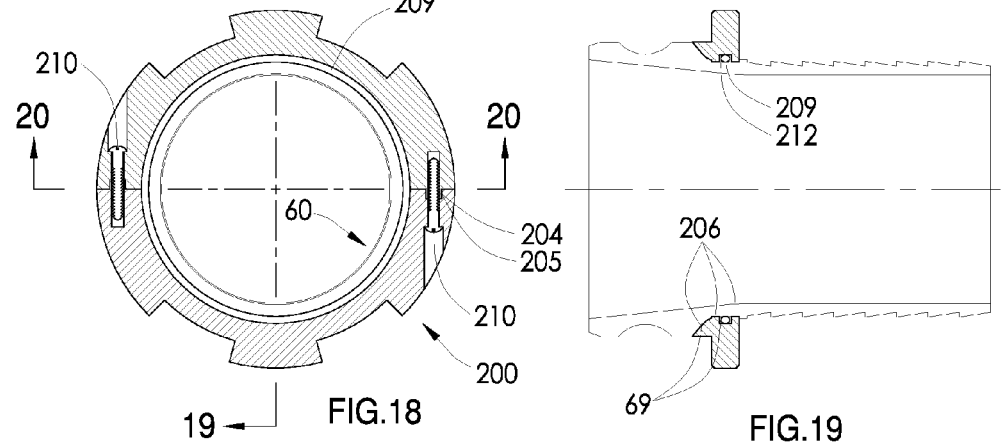
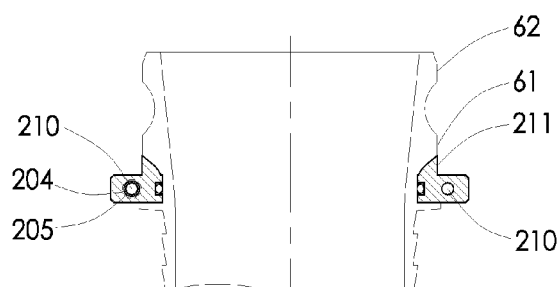

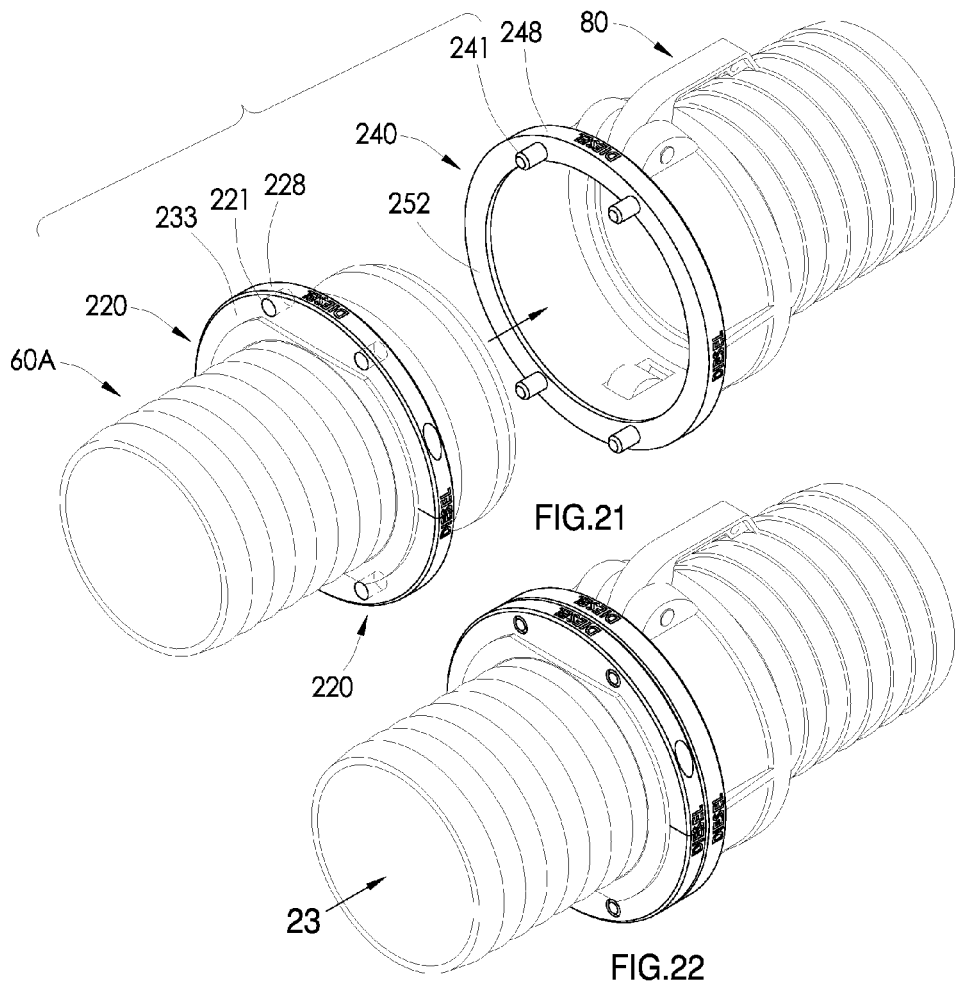
FIG.21
FIG.22
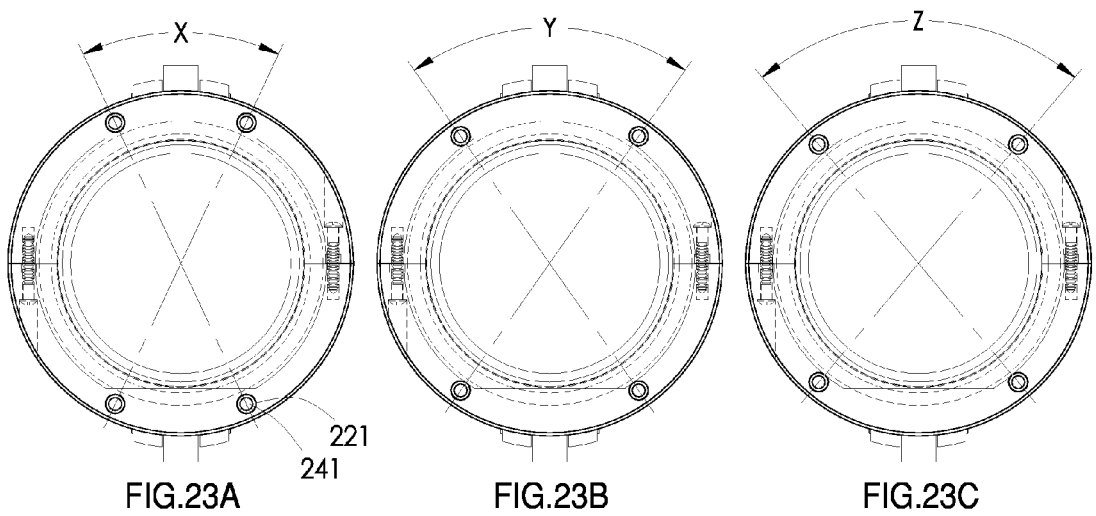
FIG.23A  FIG.23B  FIG.23C

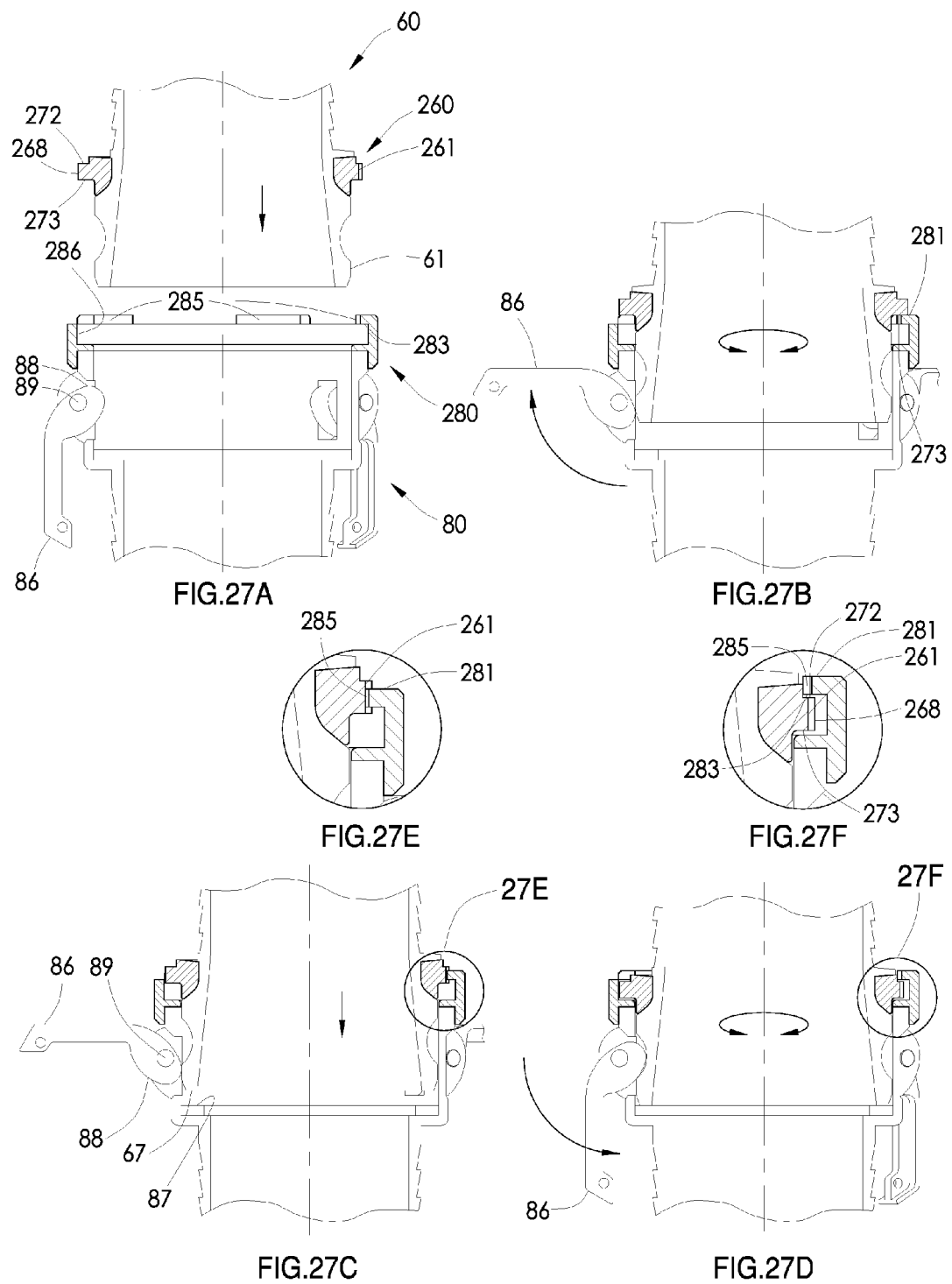

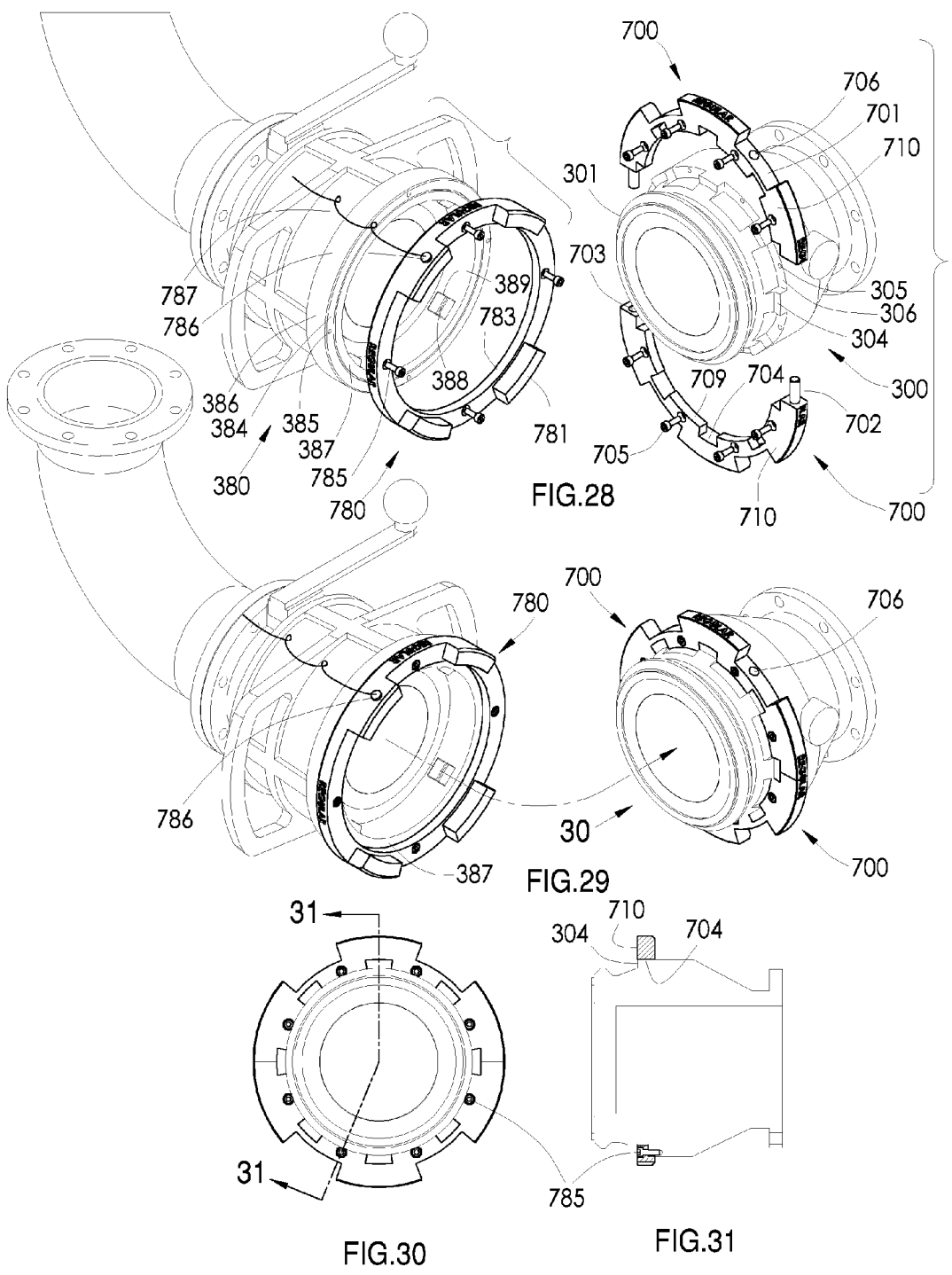

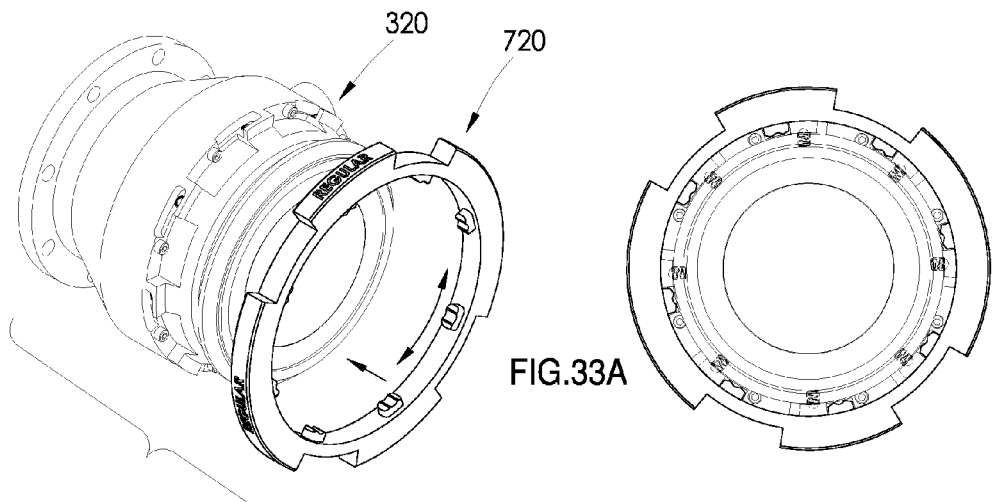
FIG.33A
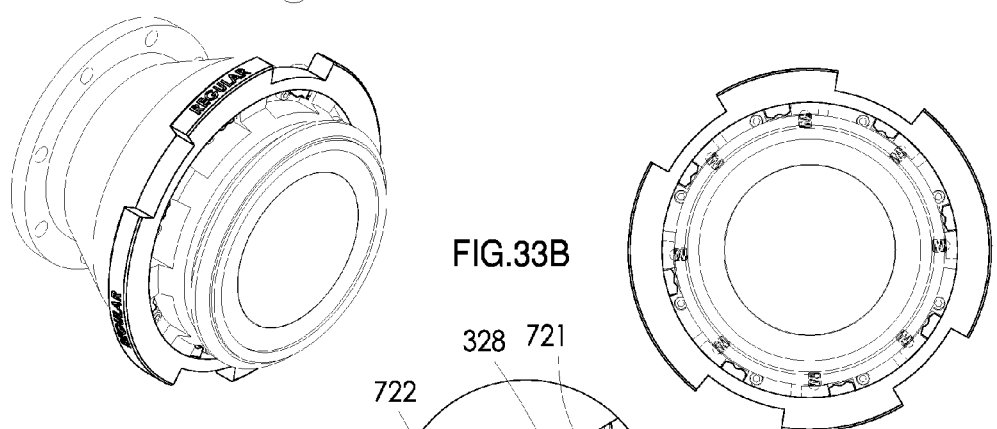
FIG.33B
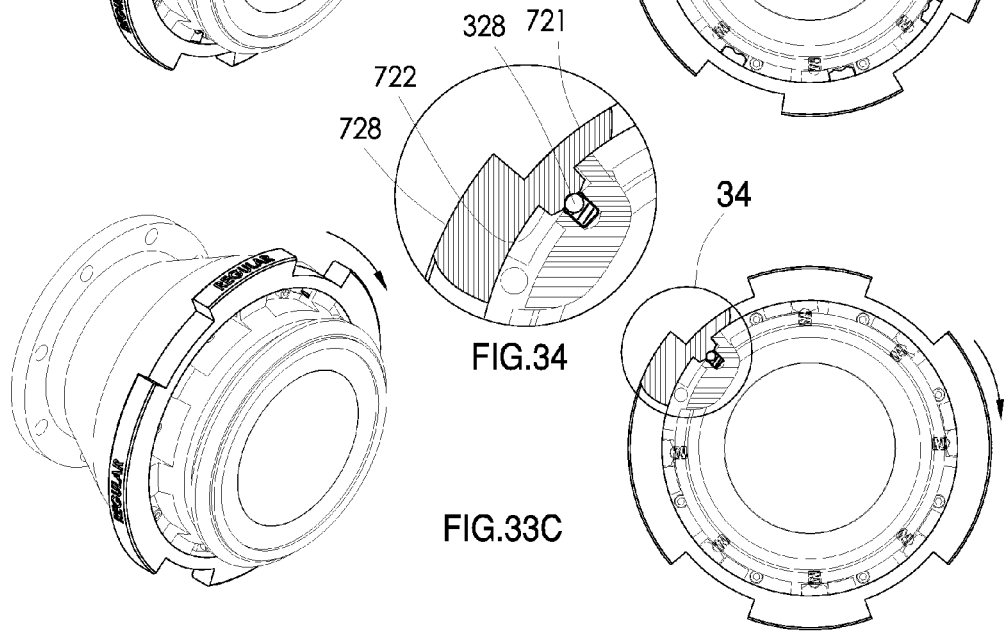
FIG.34
FIG.33C

COUPLING WITH COMPONENTS WHICH PREVENT INTERCHANGEABILITY

CROSS-REFERENCE TO RELATED APPLICATION

This application claims the benefit of U.S. Provisional Application No. 62/119,217, filed Feb. 22, 2015 by the present inventors, which is incorporated by reference.

BACKGROUND—FIELD

This application relates to coupling devices specifically to such coupling devices which are used with hose, pipe, valves, conduits, tanks, fittings and the like where the couplings have components which prevent interchangeability.

BACKGROUND—PRIOR ART

In U.S. Pat. No. 2,518,026 a coupling is disclosed that is commonly called a camlock coupling today. This camlock coupling is in general use today across a wide variety of industries. It is used for making quick release, fluid tight connections between hose, pipe, valves, conduits, tanks, fittings and the like to facilitate the transport of liquids, solids and slurries.

The delivery of fuel to gas stations is an example of an industry that makes extensive use of camlock style couplings for loading tanker trailers at fuel depots and unloading fuel from tanker trailers into storage tanks at gas stations. A typical tanker trailer will carry and unload a combination of diesel fuel, various grades of gasoline and ethanol based fuels. The camlock coupling used on the hose connections and related fittings is the same size and design regardless of the fuel being loaded or unloaded and this can result in cross contamination or accidental mixing of fuels in both the tanker trailer or more commonly in the storage tank at the gas station. For instance it is all too easy to connect a hose between the diesel compartment of the tanker trailer and the regular gasoline storage tank at the gas station since all the camlock coupling connections are identical. Even with procedures, color coding and dog tag systems in place these "crossovers" or "mixes", as the industry refers to them, are all too common and costly to rectify. Diesel and gasoline mixes that end up in customer vehicles can result in expensive engine repairs and a serious loss of reputation in the marketplace for the oil company. Mixes can also result in motorist and boaters becoming stranded with engine failure which can be a serious safety issue and a potential liability concern for oil companies.

Our Canadian Patent No. 2800795 discloses a complex and expensive camlock coupling that requires non-standard castings or direct machining and permanent modification of standard camlock couplings to form recesses and add protrusions to prevent interchangeability.

Machining recesses in the male plug member permanently configures the male plug member for that specific angular configuration or product and it cannot be returned to a standard or non-configured male plug member without rework far exceeding the value of a new male plug member. This does not allow any flexibility to reconfigure the male plug member with a different configuration of recesses to suit another product. Machining recesses large enough to be effective will result in removing material on the leading seal face of the male plug member which will affect the seal between the male plug member and female socket member. If the recess is made shallow enough to avoid cutting through end seal face it will be so small that the coupling halves can easily bind or jam on each other when the equally small protrusions and recesses are misaligned. The recess also cuts through the peripheral groove where the cam lobe portion of the locking members in the female socket member contact and push the male plug member to the sealing or locking position. Recesses aligned with one or more locking members will reduce the contact area in the peripheral groove that the cam lobe portion of the locking member bears against. Concentrated clamping loads in these areas of reduced bearing area will lead to increased wear and deformation that will result in sealing failures. Machining permanent recesses in the male plug member means that rotation of the recesses around the male plug member to rotationally align the recesses prior to assembly with a female socket member with matching protrusions is not possible.

Machining mounting holes for protrusions in the female socket member permanently configures the female socket member for that specific angular configuration or product and it cannot easily be returned to a standard or non-configured female socket member without repairs far exceeding the value of a new female socket member. This does not allow any flexibility to reconfigure female socket members with a different configuration of protrusions to suit another product. Machining fixed mounting holes for protrusions in the female socket member or having nonstandard castings designed to accept fixed protrusions means that rotation of the protrusions relative to the female socket member prior to assembly is not possible.

Relative rotation of the male plug member and female socket member halves of the camlock coupling modified with recesses and protrusions can only take place after assembly of the coupling, but prior to activating the locking members, so there is no means of pre-aligning the protrusions or recesses prior to assembling the coupling. This makes hose connections to other hoses and fittings difficult if not impossible if the barbed hose end fittings are misaligned on a particular length of hose since the entire hose and it's end fittings must be rotated in order to align the protrusions and recesses prior to assembly. If one end of the hose is already clamped in place it will be difficult if not impossible to twist the hose to align the protrusions and recesses on the other end of the hose to make the next connection. This problem is further exasperated when two or more lengths of hose need to be connected together to make the required connections between the tanker trailer and the storage tank. Further, if the coupling halves are assembled with the protrusion and recesses rotated relative to each other so that they are not aligned they cannot be separated axially as the protrusions are trapped in the peripheral groove of the male plug member so the coupling must rely on alignment marks to realign the protrusions and recesses before the coupling halves can be separated.

Our U.S. application Ser. No. 14/187,306, Publication Number 2015-0240977 A1, discloses an API flow valve having a replaceable flange or nose ring with recesses. The API valve can only be assembled to a mating female socket member configured with protrusions that match the recesses in the replaceable flange.

An API valve with an easily removable and replaceable nose ring is not as robust or solid as an API valve with a fixed, machined nose ring that is integral to the body of the API valve. An easily replaced nose ring will wear out more rapidly than a fixed nose ring after repeated use and this will lead to more frequent sealing problems. A fixed nose ring with no looseness or play is critical to achieving a proper seal between the API valve and the female socket member. A robust replaceable nose ring will be expensive to implement so moving the recesses from the nose ring to a location where it does not interfere with or compromise the standard sealing and clamping locking features when mating with a bottom loading head or drop would be far better. With the recesses moved away from the nose ring the component carrying the recesses can be now be much simpler, lighter and less expensive in construction since it only needs to tag the API valve with the recess configuration (fuel) to be loaded and unloaded and no longer has to function as part of the sealing and clamping system. Moving the recesses away from the nose ring will result in a more robust design that the fuel delivery industry will accept.

Another disadvantage of the replaceable nose ring is that the mating bottom loading head and drop adapter female socket members that connect to the API valve will require machined mounting holes for the protrusions for each specific angular configuration or product and these configured female socket members cannot be easily returned to a non-configured female socket member without repairs far exceeding the value of a new female socket member. This does not allow any flexibility to reconfigure female socket members with a different configuration of protrusions to suit another product. Machining fixed mounting holes for protrusions in the couplers or having nonstandard castings designed to accept fixed protrusions means that rotation of the protrusions around the female socket member prior to assembly is not possible.

From the preceding discussion it is clear that the combination of U.S. application Ser. No. 14/187,306 and Canadian Patent No. 2800795 results in an expensive, cumbersome and inflexible coupling and system to tag, load and unload tanker trailers to prevent crossovers. The inherent problems will be a significant barrier to acceptance in the fuel delivery industry. A coupling that can be quickly, easily and cheaply configured for any configuration of the recesses and protrusions and just as easily be returned to a standard or non-configured coupling by simply removing these features will make for a far more flexible, cost effective and modular coupling. If the protrusions and recesses can be freely rotated independent of the coupling itself, both before and after assembly, assembly of the coupling halves will be easy. If the coupling can be separated axially without having to pre-align the protrusions and recesses this will save time and eliminate potential frustration. Thus a coupling that can be configured for a specific fuel that includes all the benefits noted above and that can be easily extended and adapted to all the couplings, fittings and valves that make up the entire system to load and unload tanker trailers, would eliminate the potential for crossovers without getting in the way of the operators using the system. This and other advantages will become apparent from a consideration of the ensuing description and accompanying drawings.

SUMMARY OF THE INVENTION

According to the invention there is provided a quick-disconnect coupling comprising a male plug member and a female socket member. The female socket member defining an opening into which a leading end of the male plug member can be inserted so that the male plug member is moved longitudinally of an axis of the female socket member into the opening to a locking position.

The male plug member and female socket member defining a duct passing therethrough for communication of a fluid therebetween.

A locking arrangement is provided for locking the male plug member in the female socket member at the locking position wherein the locking arrangement includes a plurality of circumferentially spaced locking members within a respective side opening of the female socket member for movement radially inward towards the axis of the female socket member into locking engagement with a portion of the male plug member.

Each locking member being pivotally connected to the female socket member for radially outward movement to disengage the locking members from locking engagement with the portion of the male plug member.

Cooperating components are provided on an outside surface of the female socket member and on an outside surface of the male plug member. The cooperating components comprising at least one protrusion provided on either the female socket member or on the male plug member and at least one recess provided on either the female socket member or on the male plug member.

The cooperating components defined by at least one recess and at least one protrusion being cooperatively shaped and arranged to allow insertion of the male plug member into the female socket member to the locking position when at least one recess and at least one protrusion match.

The cooperating components defined by at least one recess and at least one protrusion being cooperatively shaped and arranged to prevent insertion of the male plug member into the female socket member to the locking position when at least one recess and at least one protrusion do not match or are not aligned. That is the user is prevented from activating the locking members when the protrusions and recesses do not match or are not aligned by virtue of the predetermined length of the protrusion which prevents axial assembly to the locking position.

Preferably the cooperating components are provided on a leading end of the female socket member and on a trailing end of the male plug member. Wherein the trailing end is located a predetermined distance from the leading end of the male plug member to allow insertion of the male plug member into the female socket member to the locking position.

Preferably there is provided a plurality of protrusions and a plurality of recesses at a predetermined spacing therebetween and wherein insertion of the male plug member into the female socket member to the locking position is allowed only when said predetermined spacing matches. However a single protrusion and associated recess can be used where they are set at a predetermined angle around the coupling and/or have a predetermined dimension and height.

Preferably the protrusions and recesses are visible when the male plug member and the female socket member are connected and when they are separated so as to ensure alignment when relative movement is undertaken. That is the user can see the location of the protrusions and recesses to ensure that they are aligned as the user tries to insert the components or to separate.

That is for example the rotational and axial alignment for assembly and disassembly of the coupling can be made evident by way of the protrusions and recesses themselves.

Preferably the male plug member has an external peripheral groove or flange for engagement with the locking arrangement of the female socket member and the protrusions and recesses are located to prevent movement of the groove or flange to the locking arrangement unless aligned. This allows that the female socket member and the male plug member can be rotated relative to each other before assembly. That is the recess and the protrusion do not cooperate with the locking arrangement, to hold the components connected but act as a restriction to allow the locking arrangement to engage only when the recess and protrusion match.

Preferably the protrusions are located on the female socket member and the recesses are located on the male plug member.

Preferably there is provided a sealing member for sealing between the male plug and the female socket in the locking position, the sealing member being located separate from the protrusions and the recesses so that they do not interfere with the action of the sealing member.

Preferably the recess and protrusion are provided on separate body portions to facilitate mounting of said recesses and protrusions.

Preferably the separate body portion on either the female socket member or male plug member can be rotated relative to said female socket member or said male plug member either before or after assembly.

Preferably the male plug member and the female socket member both have a circular cross-section. This allows rotation of the separate body portions as mentioned above.

Preferably an o-ring or other rotational restriction means is provided between the separate body portion and either of the female socket member or male plug member to act as a restriction to rotation to aid in retaining a preset rotational orientation of the separate body portion.

Preferably the separate body portion is easily mounted to or removed from the coupling, valve or fitting to permit changing the configuration or to return the coupling, valve or fitting to a non-configured coupling, valve or fitting.

That is the mounting of the separate body portions can be achieved by bonding, fastening with screws, bayonet mounting, use of an expandable and contractible ring, over center clamp ring or by any other method or device.

Preferably the separate body portions provide protection of the male plug member and the female socket member by virtue of the larger diameter of the separate body portions that help prevents contact of the male plug member and female socket member with the ground or other surface.

Preferably the separate body portion on the male plug member is further protected from contact with the ground or other surface by being completely contained within a larger separate body portion on the female socket member when assembled.

Preferably the separate body portion includes a text label or other identification means for indicating the name of the product or fluid corresponding to the specific configuration of the recesses and protrusions.

Preferably the separate body portion includes a lug for attachment of a protective cap with a lanyard. The protective cap is used to cover the leading end of the male plug member when it is not mated with a female socket member.

Preferably the separate body portions mounted to the male plug member and the female socket member when assembled can be separated axially without having to align the protrusions and recesses to permit separation.

Preferably the matched protrusions and recesses on the separate body portions are shaped and located so that they are not interchangeable with a coupling configured with a different configuration of protrusions and recesses.

Preferably the separate body portions are made from any metal or plastic that can be formed by casting, compression molding, injection molding, machining, fused deposition modeling, selective laser sintering or any other process or combination of such processes.

Preferably one separate body portion includes a sensor or switch to detect the presence of a mating separate body portion when the protrusions and recesses match.

Preferably a female socket member or bottom loading head without a separate body portion or cooperating components includes one or more sensors or switches capable of detecting the presence of a specific configuration of a separate body portion that is attached to the male plug member or API valve. That is the switch or sensor can determine the specific configuration of the separate body portion when the female socket member and male plug member are engaged with each other so as to signal or notify the control system of the specific separate body portion so that the control system only allows the discharge of the product associated with the configuration of said separate body portion.

Preferably the system allows for backwards compatibility with non-configured couplings. This can be achieved by the fact that either one of the standard female socket member or the male plug member which does not carry recesses or protrusions can be mated to a configured male plug member or configured female socket member having recesses or protrusions.

In particular the present invention is particularly designed for use with a camlock coupling of the type in which the locking arrangement includes a plurality of locking members each having a lever within a respective side opening of the female socket member and a cam lobe portion passing through one of the respective side openings and engaging a portion of the male plug member and each being pivotally connected to the female socket member for outward movement of the levers away from the female socket member to disengage the cam lobe portions from the portion of the male plug member. Some examples of where such couplings are used include connections between two hoses, a hose and drop adapter, a hose and hose elbow, a hose and drop elbow, a drop elbow and top seal adapter.

The present invention is also particularly designed for use with a camlock drop adapter of the type in which the locking arrangement includes a plurality locking members each having a lever within a respective side opening of the female socket member and each lever having a cam lobe portion passing through each side opening to engage a portion of the API valve annular flange member and each being pivotally connected to the female socket member for outward movement of the levers away from the female socket member to disengage the cam lobe portions from the API valve annular flange member.

The present invention is also particularly designed for use with a bottom loading head of the type in which the locking arrangement includes a plurality of circumferentially spaced locking members within a respective side opening of the female socket member which are actuated simultaneously by a separate hand lever for movement of the locking members to engage or disengage the API valve annular flange member.

According to a second aspect of the invention there is provided a method of loading and unloading a plurality of different fluids comprising and providing for each fluid a respective delivery duct and providing in each delivery duct a configured coupling, valve or fitting as defined above and arranging at least one protrusion and at least one recess of a first one delivery duct to have a different configuration from that of a second one of the delivery ducts to prevent interchangeability of the first and second delivery ducts at the couplings.

BRIEF DESCRIPTION OF THE DRAWINGS

Embodiments of the invention will be described hereinafter in conjunction with the accompanying drawings in which:

FIG. 1 through FIG. 10D shows a camlock style hose coupling comprising a male plug member and female socket member configured with separate female body portions and a separate male body respectively.

FIG. 1 is an isometric exploded view showing two separate female body portions prior to assembly onto a male plug member and a separate male body prior to assembly onto a female socket member.

FIG. 2 is an isometric view showing two separate female body portions assembled onto a male plug member and a separate male body assembled onto a female socket member. The coupling halves are shown separated.

FIG. 4 is an isometric view of the coupling halves separated but aligned for assembly with the separate female body portions and separate male body configured with an angular spacing of the recesses and protrusions for Diesel fuel.

FIG. 5 is an isometric view of the coupling halves separated but aligned for assembly with the separate female body portions and separate male body configured with an angular spacing of the recesses and protrusions for Regular fuel.

FIG. 6 is an isometric view of the coupling halves separated but aligned for assembly with the separate female body portions and separate male body configured with an angular spacing of the recesses and protrusions for Premium fuel.

FIG. 7 is an enlarged isometric view of the coupling halves assembled with the locking members engaged showing the separate female body and separate male body interlocked with each other.

FIG. 8 is an end view of FIG. 7 viewed from the hose barb end of the male plug member.

FIG. 9 is a detail view of one recess and one protrusion aligned and mated with each other.

FIG. 10A is a cross section view of the coupling halves prior to assembly with the recesses and protrusions aligned.

FIG. 10B is a cross section view of the coupling halves showing assembly interference between the recesses and protrusions when they are rotated out of alignment with each other thereby preventing actuation of the locking members.

FIG. 10C is a cross section view of the coupling halves showing the recesses and protrusions rotated back into alignment and partially engaged axially with each other.

FIG. 10D is a cross section view of the coupling halves showing the recesses and protrusions aligned and fully engaged so that the locking members can be actuated to complete the assembly.

FIG. 11 is an isometric exploded view showing two fixed (non-rotating) inner stationary ring portions prior to assembly onto a male plug member and two rotatable separate female body portions prior to assembly onto the two inner stationary ring portions.

FIG. 12 is a partial side view of the fixed inner stationary ring portions and the rotatable separate female body portions assembled onto the male plug member.

FIG. 13 is a cross section view through the fixed inner stationary ring portions and rotatable separate female body portions assembled onto the male plug member.

FIG. 14 is a cross section view through the fixed inner stationary ring portion alignment pins and alignment holes.

FIG. 15 is a cross section view through the separate female body portion alignment pins and alignment holes.

FIG. 16 through FIG. 20 shows a male plug member configured with two rotatable separate female body portions.

FIG. 16 is an isometric exploded view showing two rotatable separate female body portions prior to assembly onto the male plug member.

FIG. 17 is a partial side view of the two rotatable separate female body portions assembled onto the male plug member.

FIG. 18 is a cross section view through the separate female body portions assembled onto the male plug member.

FIG. 19 is a cross section view through the separate female body portions assembled onto the male plug member.

FIG. 20 is a cross section view through the fastener joining the separate female body portions onto the male plug member.

FIG. 21 through FIG. 23C shows a camlock style hose coupling comprising a male plug member and female socket member configured with rotatable separate female body portions with holes as the recesses and a separate male body with pins as the matching protrusions.

FIG. 21 shows the camlock hose coupling separated with two separate female body portions assembled on the male plug member and the separate male body assembled on the female socket member.

FIG. 22 shows the camlock hose coupling mated together with the protrusion pins on the separate male body aligned and engaged with the through hole recesses on the separate female body portions.

FIG. 23A shows the angular spacing X of the recesses and protrusions for product X.

FIG. 23B shows the angular spacing Y of the recesses and protrusions for product Y.

FIG. 23C shows the angular spacing Z of the recesses and protrusions for product Z.

FIG. 24 through FIG. 27F shows a camlock hose coupling comprising a typical industry standard male plug member and female socket member configured with two separate female body portions having a reduced diameter and a separate male body with overhanging protrusions.

FIG. 24 shows the camlock hose coupling separated with two separate female body portions having a reduced diameter assembled on the male plug member and the separate male body with overhanging protrusions assembled on the female socket member.

FIG. 25 is an end view showing the protrusions and recesses aligned to permit assembly of the coupling.

FIG. 26 is an enlarged detail view of one protrusion and one recess aligned to permit assembly of the coupling.

FIG. 27A is a cross section view of the coupling halves prior to assembly with the recesses and protrusions aligned.

FIG. 27B is a cross section view of the coupling halves showing assembly interference between the recesses and protrusions when they are rotated out of alignment with each other thereby preventing actuation of the locking members.

FIG. 27C is a cross section view of the coupling halves showing the recesses and protrusions rotated back into alignment and partially engaged axially with each other.

FIG. 27D is a cross section view of the coupling halves showing the recesses and protrusions aligned and fully engaged so that the locking members can be actuated to complete the assembly.

FIG. 27E is an enlarged detail view showing the recesses and protrusions aligned and partially engaged axially with each other.

FIG. 27F is an enlarged detail view showing the recesses and protrusions aligned and fully engaged so that the locking members can be actuated to complete the assembly.

FIG. 28 through FIG. 31 shows an API valve configured with two fastened separate female body portions with recesses and a bottom loading head configured with a fastened separate male body with protrusions.

FIG. 28 is an isometric exploded view showing two separate female body portions prior to fastening onto an API valve and a separate male body prior to fastening onto a bottom loading head.

FIG. 29 is an isometric view showing two separate female body portions fastened to an API valve and a separate male body fastened to a bottom loading head prior to mating of the API valve with the bottom loading head.

FIG. 30 is an end view of the API valve with the two separate female body portions fastened in place on the API valve.

FIG. 31 is a cross section view of the API valve showing the two separate female body portions fastened in place on the API valve.

FIG. 32 through FIG. 34 shows an API valve configured with a separate female body with a bayonet mounting.

FIG. 32 is an isometric exploded view showing the bayonet separate female body prior to assembly onto an API valve that is configured with cooperating spring plungers.

FIG. 33A is an isometric and end view showing the bayonet separate female body rotated and aligned with the cooperating mounting surfaces on the API valve prior to axial assembly of the bayonet separate female body.

FIG. 33B is an isometric and end view showing the bayonet separate female body after axial assembly on to the API valve but prior to rotation of the bayonet separate female body to its locked position.

FIG. 33C is an isometric and end view showing the bayonet separate female body after final rotation of the bayonet separate female body to its locked position.

FIG. 34 is an enlarged cut away detail end view of the bayonet separate female body in its final rotated and locked position showing the cooperating spring plungers holding the ring in its locked position.

FIG. 35 through FIG. 36C shows an API valve configured with a separate female body with an expandable diameter.

FIG. 35 is an isometric exploded view showing the separate female body with an expandable diameter prior to assembly onto an API valve that is configured with a cooperating mounting annular groove.

FIG. 36C is an isometric and end view showing the separate female body with an expandable diameter with its diameter shown contracted after assembly of the separate female body with expandable diameter on to the API valve and further showing that rotation of the separate female body can be undertaken after assembly.

Figure 1:
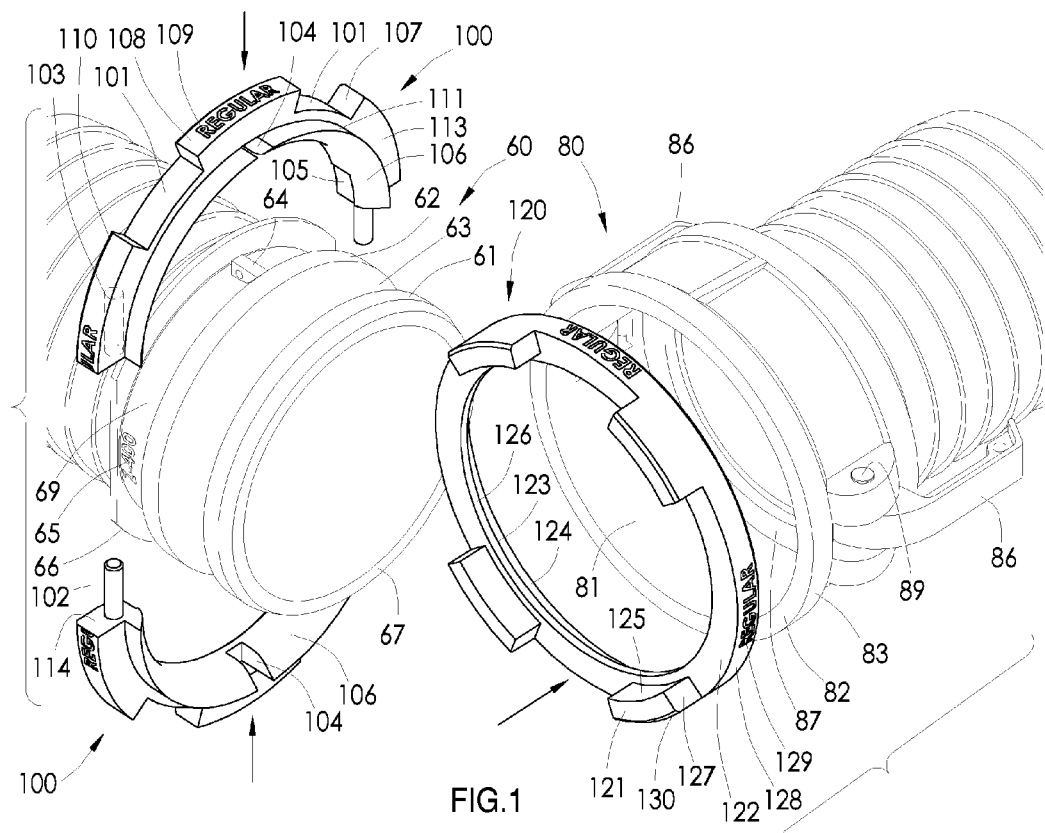

| DRAWINGS - Reference Numerals | |
| --- | --- |
| X | Angular Spacing of Protrusions and Recesses (Diesel) |
| Y | Angular Spacing of Protrusions and Recesses (Regular) |
| Z | Angular Spacing of Protrusions and Recesses (Premium) |
| 10 | Axis |
| 20 | Predetermined Distance |
| 30 | Predetermined Length |
| 60 | Male Plug Member |
| 61 | Leading Circular Plug |
| 62 | Trailing Circular Plug |
| 63 | Peripheral Groove |
| 64 | Lug |
| 65 | Embossed Lettering |
| 66 | Hose Stop Flange |
| 67 | Leading End |
| 69 | Generally Annular Groove |
| 80 | Female Socket Member |
| 81 | Circular Passage |
| 82 | Leading End |
| 83 | Outer Circular Surface |
| 84 | Side Opening |
| 86 | Locking Member |
| 87 | Sealing Member |
| 88 | Cam Lobe |
| 89 | Pivot Pin |
| 100 | Separate Female Body Portion |
| 101 | Recess |
| 102 | Alignment Pin |
| 103 | Alignment Hole |
| 104 | Lug Recess |
| 105 | Lettering Recess |
| 106 | Generally Annular Shape |
| 107 | Radial Surface |
| 108 | Outer Cylindrical Surface |

| DRAWINGS - Reference Numerals | |
|---|---|
| 109 | Identification Means |
| 110 | Chamfer |
| 111 | Cylindrical Neck |
| 112 | Trailing Surface |
| 113 | Leading Surface |
| 114 | Mating Surface |
| 120 | Separate Male Body Portion |
| 121 | Protrusion |
| 122 | Outer Annular Surface |
| 123 | Inner Annular Surface |
| 124 | Inner Circular Surface |
| 125 | Cylindrical Inner Surface |
| 126 | Inner Cylindrical Surface |
| 127 | Radial Surface |
| 128 | Outer Cylindrical Surface |
| 129 | Identification Means |
| 130 | Chamfer |
| 150 | Inner Stationary Ring |
| 151 | Annular Outer Groove |
| 152 | Alignment Pin |
| 153 | Alignment Hole |
| 154 | Lug Recess |
| 155 | Lettering Recess |
| 156 | Generally Annular Shape |
| 157 | Mating Surface |
| 170 | Separate Female Body Portion |
| 171 | Recess |
| 172 | Alignment Pin |
| 173 | Alignment Hole |
| 174 | Inner Annular Rib |
| 184 | Mating Surface |
| 200 | Separate Female Body Portion |
| 201 | Recess |
| 202 | Counterbored Hole |
| 203 | Threaded Hole |
| 204 | Alignment Boss |
| 205 | Alignment Counterbore |
| 206 | Generally Annular Shape |
| 207 | Back Surface |
| 209 | Rotational Restriction Means |
| 210 | Fastener |
| 211 | Cylindrical Neck |
| 212 | O-Ring Groove |
| 214 | Mating Surface |
| 220 | Separate Female Body Portion |
| 221 | Recess |
| 228 | Outer Cylindrical Surface |
| 233 | Leading Surface |
| 240 | Separate Male Body Portion |
| 241 | Protrusion |
| 248 | Outer Cylindrical Surface |
| 252 | Leading Surface |
| 260 | Smaller Separate Female Body Portion |
| 261 | Recess |
| 268 | Outer Cylindrical Surface |
| 272 | Trailing Surface |
| 273 | Leading Surface |
| 280 | Larger Separate Male Body Portion |
| 281 | Protrusion |
| 283 | Inside Surface of Protrusion |
| 285 | Cylindrical Inner Surface of Protrusion |
| 286 | Inner Cylindrical Surface |
| 300 | Male Plug Member |
| 301 | Annular Flange |
| 304 | Protruding Surface |
| 305 | Threaded Hole |
| 306 | Mounting Surface |
| 320 | Male Plug Member |
| 323 | Bayonet Groove |
| 324 | Mounting Hole |
| 325 | Spring Plunger Assembly |
| 326 | Cup |
| 327 | Spring |
| 328 | Ball |
| 340 | Male Plug Member |
| 342 | Annular Groove |
| 344 | Outer Cylindrical Surface |
| 360 | Male Plug Member |
| 380 | Female Socket Member |
| 384 | Leading End |
| 385 | Threaded Hole |
| 386 | Outer Collar |
| 387 | Inner Collar |
| 388 | Locking Member |
| 389 | Side Opening |
| 400 | Drop Adapter |
| 420 | Hose |
| 440 | Drop Elbow |
| 460 | Top Seal Adapter |
| 480 | Hose Elbow |
| 500 | Unloading Valve |
| 520 | Load/Unload Wye Pipe |
| 540 | Load/Unload Pipe |
| 600 | Tanker Trailer with Load/Unload API Valves |
| 601 | Tanker Trailer with Load Only API Valves |
| 602 | Fuel Flow into Tanker Trailer Compartment |
| 603 | Fuel Flow out of Tanker Trailer Compartment |
| 700 | Separate Female Body Portion |
| 701 | Recess |
| 702 | Alignment Pin |
| 703 | Alignment Hole |
| 704 | Notch |
| 705 | Fastener |
| 706 | Sensor Contact or Magnet |
| 709 | Inner Cylindrical Surface |
| 710 | Front Surface |
| 720 | Separate Female Body Portion |
| 721 | Recess |
| 722 | Positioning Block |
| 722A | Lead-in Angled Ramps |
| 722B | Inner Angled Ramps |
| 723 | Identification Means |
| 724 | Inner Cylindrical Surface |
| 728 | Outer Cylindrical Surface |
| 740 | Separate Female Body Portion |
| 741 | Recess |
| 743 | Identification Means |
| 744 | Inner Annular Rib |
| 745 | Inner Cylindrical Surface |
| 746 | Finger Saddle |
| 747 | Finger Lever |
| 748 | Outer Cylindrical Surface |
| 750 | Separate Female Body Portion |
| 780 | Separate Male Body Portion |
| 781 | Protrusion |
| 783 | Inner Cylindrical Surface |
| 785 | Fastener |
| 786 | Sensor |
| 787 | Sensor Lead Wire |
| 790 | Separate Male Body Portion |
| 800 | Lanyard |
| 801 | Lanyard Fastener |

DETAILED DESCRIPTION

FIG. 1 shows an example of a commercially available, 4" quick-disconnect camlock coupling comprising a male plug member 60 and a mating female socket member 80. The female socket member defining an opening into which a leading end of the male plug member can be inserted so that the male plug member is moved longitudinally of an axis 10 of the female socket member into the opening to a locking position. The male plug member and female socket member defining a duct passing therethrough for communication of a fluid therebetween. Both the male plug member and female socket member are shown with hose barb ends but any means of connecting the coupling halves to any other device, conduit, fitting or valve for use may be provided. The basic form, fit and function of the coupling is disclosed in U.S. Pat. No. 2,518,026 but with the following improvements;

The female socket member 80 and male plug member 60 are provided with cooperating components. The cooperating component on the male plug member comprising one or more recesses 101 in the separate female body portions 100 interlock with the cooperating component on the female socket member comprising one or more protrusions 121 on the separate male body 120. Coupling halves are defined by the female socket member 80 and its separate male body 120 defining a first half of the coupling and the male plug member 60 with its separate female body 100 defining the second half of the coupling.

Two separate female body portions 100 each with an generally annular shape 106 with cutout lug and lettering recesses 104 and 105 are shaped and arranged to snuggly mount to male plug member 60 with an generally annular groove 69 with protruding lug 64 and embossed lettering 65. The protruding lug 64 is provided on male plug member 60 to facilitate connection of a lanyard with a protective end cap attached to keep dust and dirt out of an otherwise open male plug member (lanyard and end cap not shown). The embossed lettering 65 indicates the part number of the male plug member. The separate female body portions 100 each include an alignment pin 102 and an alignment hole 103 that are used to align and bond the two separate female body portions by application of an adhesive to the pins 102, holes 103 and mating surfaces 114 to form a single separate female body. When two separate female body portions are assembled together onto a male plug member so as to form a complete separate female body it will simply be referred to as a separate female body using the same reference number 100 as the individual separate female body portions. Should additional bonding strength be required adhesive can also be applied between the generally annular shape 106 and generally annular groove 69. Due to the snug tight fit of the separate female body portions 100 to the male plug member 60 and rotational interference between the lug 64 and lug recess 104 no relative rotation of the assembled separate female body 100 is possible on the male plug member 60.

The separate male body 120 has an inner annular surface 123 and inner circular surface 124 that is shaped and arranged to snuggly mount to female socket member 80 with a leading end 82 and outer circular surface 83. Application of an adhesive between the annular surfaces 123 and leading end 82 completes the assembly. Should additional bonding strength be required adhesive can also be applied between the circular surfaces 124 and 83. Alternatively the inner circular surface 124 defining an annular ring can have a smaller diameter than the outer circular surface 83 such that an expansion means is required to expand the inner diameter or inner circular surface 124 to fit on the outer circular surface 83. The outer circular surface 83 defining an annular flange which has an interference fit with the the outer circular surface 83 when the expansion means is released or when the outer circular surface 83 is forced fit onto the outer circular surface 83.

Figure 2:
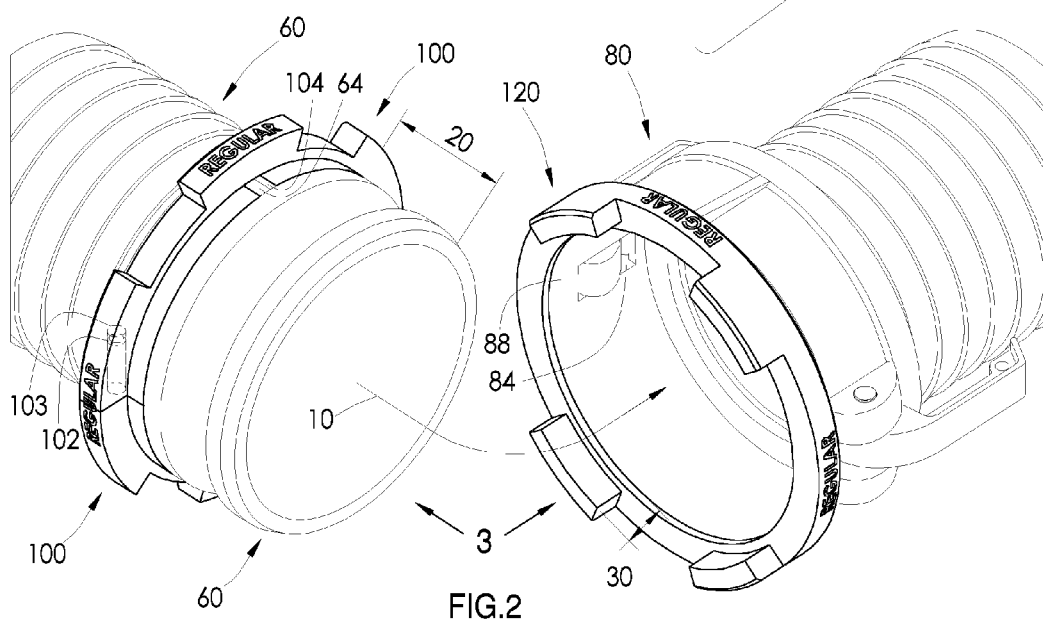

FIG. 2 shows the completed assembly of the separate female body portions 100 bonded to the male plug member 60 and the separate male body 120 bonded to the female socket member 80 prior to axial assembly of the coupling halves indicated by the curved arrow.

The separate male body 120 and the separate female body portions 100 can be cast and machined from the same aluminum as the female socket member 80 and male plug member 60 or they could be cast, formed or injection molded from any number of other metals or plastics or be made directly using rapid manufacturing methods such as fused deposition modeling or selective laser sintering. The final material selection and method of manufacture will be based on the volume of parts to be produced and performance requirements such as impact strength, wear resistance, antistatic properties, weight, ease of assembly and disassembly, visual appearance and handling characteristics.

The outer cylindrical surface 128 of the separate male body 120 defines a predetermined radial dimension that is larger than the outer leading end radial dimension of the female socket member 80 defined by the outer circular surface 83. The outer cylindrical surface 108 of the separate female body 100 defines a predetermined radial dimension that is larger than the outer leading end radial dimension of the male plug member 60 defined by the leading circular plug 61. The male plug member 60 and female socket member 80 are protected from damage caused by bumping or dragging on the ground by the larger predetermined radial dimension of the separate male body 120 and separate female body 100.

Figure 3A:
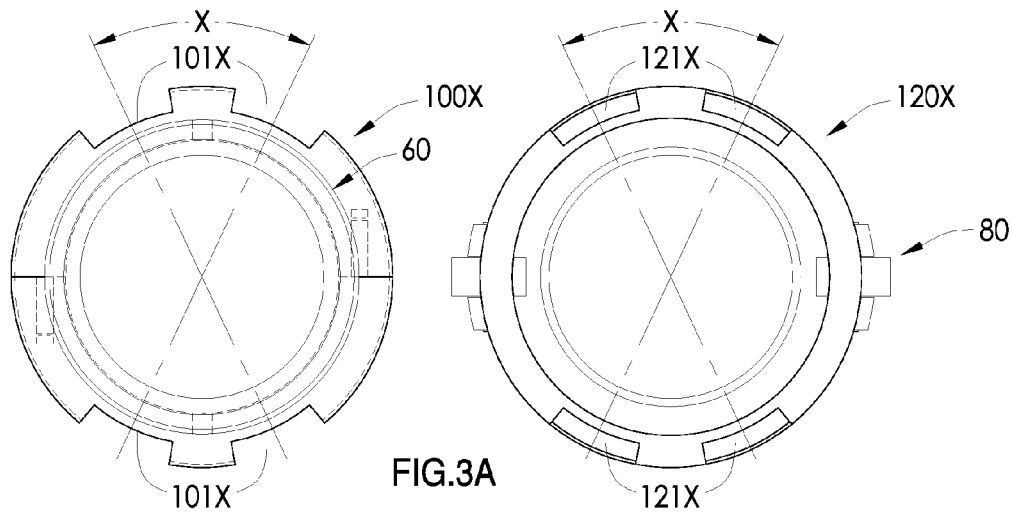
FIG. 3A is an inside end view of the separated coupling halves (see FIG. 2 for view direction) showing the angular spacing "X" of the recesses and protrusions for Diesel fuel.
Figure 3B:
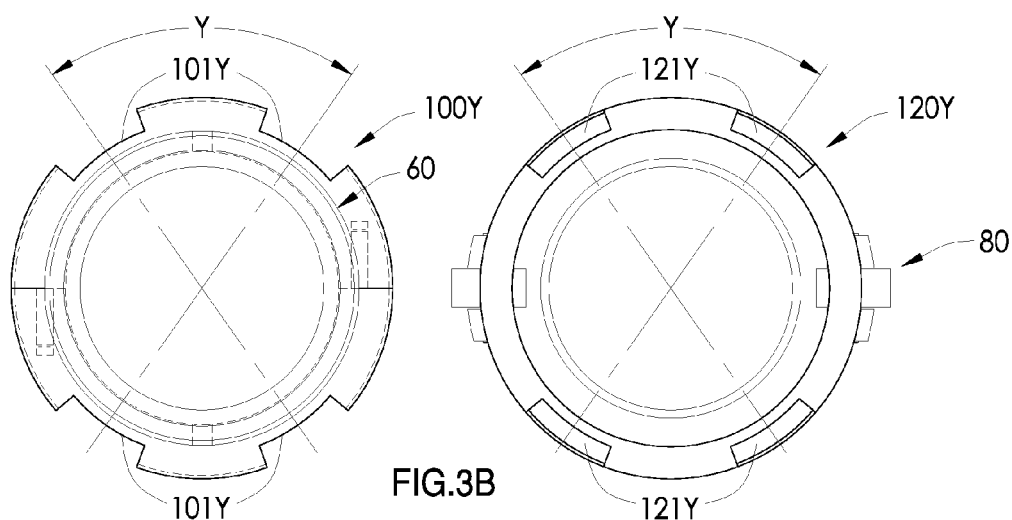
FIG. 3B is an inside end view of the separated coupling halves (see FIG. 2 for view direction) showing the angular spacing "Y" of the recesses and protrusions for Regular fuel.
Figure 3C:
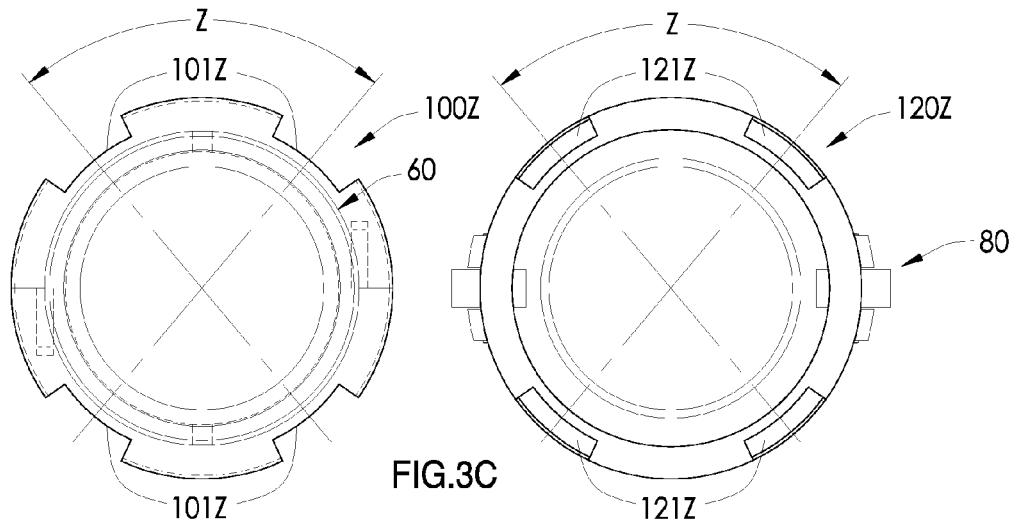
FIG. 3C is an inside end view of the separated coupling halves (see FIG. 2 for view direction) showing the angular spacing "Z" of the recesses and protrusions for Premium fuel.

FIGS. 3A, 3B, and 3C show examples of three unique angular configurations, X, Y & Z respectively, of the separate female body 100 and separate male body 120 that can only mate with each other. For example, 120X separate male bodies on female socket members only mate with 100X separate female bodies on male plug members. X angular configured fittings will not mate with fittings configured with Y or Z angular configurations.

The angular separation of the two recesses 101 and protrusions 121 at the top of the tag rings as shown in FIGS. 3A, 3B and 3C is repeated on the bottom of the tag rings to provide symmetry and a balanced feel when assembling the coupling. A virtually infinite number of symmetrical and asymmetrical angular arrangements of the protrusions 121 and recesses 101 are possible. The goal is to configure sets of mutually exclusive arrangements of the interlocking protrusions and recesses so that only like configured coupling halves will fit with each other.

Where required any female socket member, without a separate male body can still mate with any separate female body configured male plug member. Conversely any male plug member, without a separate female body can still mate with any separate male body configured female socket member. This allows for backward compatibility with non-configured camlock fittings used in the fuel delivery industry where desired or required such as for non-critical maintenance procedures such as flushing and cleaning tanker trailer storage compartments.

FIGS. 4, 5 & 6 show the male plug member 60 and female socket member 80 axially aligned for assembly with three different configurations of the separate male body 120 and separate female body 100 each in rotational alignment with each other to permit axial assembly of the coupling. Three angular configurations are shown representing three common fuels but many more configurations are possible using additional angular configurations. Asymmetrical patterns of the recesses and protrusions can create even more configurations as needed for new fuels or products to be delivered. While the examples described here are specific to the fuel delivery industry it is understood that the angular configurations shown or any other angular configurations could be used in other industries to prevent cross contamination of products in those industries.

FIG. 4 and FIG. 3A both show the X angular configuration of the recesses 101X and protrusions 121X which represents Diesel fuel. The Diesel fuel identification means 109X is embossed on the separate female body 100X and the Diesel fuel identification means 129X is embossed on the separate male body 120X to provide additional visual feedback on the compatibility of the coupling halves prior to assembly. Additional visual compatibility can be provided by using a unique color such as yellow for X configured tag rings.

FIG. 5 and FIG. 3B both show the Y angular configuration of the recesses 101Y and protrusions 121Y which represents Regular fuel. The Regular fuel identification means 109Y is embossed on the separate female body 100Y and the Regular fuel identification means 129Y is embossed on the separate male body 120Y to provide additional visual feedback on the compatibility of the coupling halves prior to assembly. Additional visual compatibility can be provided by using a unique color such as red for Y configured tag rings.

FIG. 6 and FIG. 3C both show the Z angular configuration of the recesses 101Z and protrusions 121Z which represents Premium fuel. The Premium fuel identification means 109Z is embossed on the separate female body 100Z and the Premium fuel identification means 129Z is embossed on the separate male body 120Z to provide additional visual feedback on the compatibility of the coupling halves prior to assembly. Additional visual compatibility can be provided by using a unique color such as blue for Z configured tag rings.

FIG. 9, derived from FIG. 7 and end view FIG. 8, shows a detailed view of one protrusion 121 and one recess 101 with the separate male body and separate female body mated with each other. It is understood that where the description of a feature is common to all configurations (X, Y or Z) it will be described without the configuration letter. For example recess 101 refers to any angular configuration of the recess 101. Refer to FIGS. 1, 8 and 9 which show the features described below.

The outer cylindrical surface 128 of the separate male body 120 is the same diameter as the outer cylindrical surface 108 of the separate female body 100 to ensure easy visibility of the protrusions 121 mated with the recesses 101 from any angle. This also facilitates easy reading of the embossed identification means 109 and 129 next to each other when the coupling is assembled as show in FIG. 7.

Each outer cylindrical surface of the recess 101 has an angular opening width defined by radial surfaces 107 and each protrusion 121 has a similar but slightly smaller angular width defined by radial surface 127. Each protrusion has a cylindrical inner surface 125 which is slightly larger than the outer cylindrical surface of the recess 101. An installation clearance gap of approximately 1.0 mm between these surfaces has been found to provide sufficient clearance to ensure easy assembly of the coupling which allows for slight axial misalignment of the coupling halves during assembly due to installation clearance between the circular plug surfaces 61 and 62 of the male plug member 60 and the circular passage 81 in the female socket member 80. This gap is clearly indicated by the visibility of the outer annular surface 122 around the protrusion 121 of the separate male body 120 as shown in FIG. 9.

Additional features include chamfered edges 110 between the trailing surface 112 and outer cylindrical surface 108 on the separate female body and chamfered edges 130 between the leading surface of the protrusions 121 and the outer cylindrical surface 128 on the separate male body. Chamfers 130 and 110 along with surfaces 121 and 112 are preferably flush and aligned with one another when the coupling is assembled as shown in FIG. 7 to provide visual confirmation that the coupling is correctly assembled.

FIG. 10A though FIG. 10D shows a cross section of FIG. 8 passing through one of a plurality of circumferentially spaced locking members 86, and one protrusion 121 with the coupling in different stages of axial disassembly and assembly.

FIG. 10A shows the coupling halves prior to assembly with the recesses 101 and protrusions 121 in axial and rotational alignment with each other. The cam lobe 88 of locking member 86 rotates about pivot pin 89 and is shown in the closed position. The separate female body has a cylindrical neck 111 that is flush with and the same diameter as the circular plug diameters 61 and 62 so as to permit the cylindrical neck 111 to fit inside the female socket member circular passage 81 and the inner cylindrical surface 126 of the separate male body 120. The generally annular shape 106 of the separate female body 100 conforms to the shape of the generally annular groove 69 of the male plug member 60 to maximize the contact area between these two surfaces to ensure a rigid fit.

FIG. 10B shows the male plug member 60 with its separate female body 100 partially engaged with the female socket member 80 and its separate male body 120. The male plug member 60 and separate female body 100 are shown rotated out of alignment so that the protrusions 121 and recesses 101 are misaligned. This prevents further axial assembly of the coupling due to the leading surface 113 of the separate female body 100 coming into contact with the protrusion 121. The locking member 86 is forced into the open position shown due to contact between the cam lobe 88 and the leading circular plug diameter 61. With the locking member 86 in the open position shown, clamping the two coupling halves together is not possible. The open position of the locking member 86 provides visual feedback that the coupling is not correctly assembled or that an incompatible combination of the separate male body 120 and separate female body 100 was attempted.

The protrusions 121 have a predetermined length 30 projecting longitudinally from the leading end 82 of the female socket member 80. The recesses 101 are set back a predetermined distance 20 from the leading end 67 of the male plug member 60. The predetermined length 30 and the predetermined distance 20 are selected to prevent the locking member 86 from engaging with the peripheral groove 63 of the male plug member 60 when the protrusions 121 and recesses 101 are rotationally misaligned or do not match.

FIG. 10C shows the male plug member 60 with its separate female body 100 partially engaged with the female socket member 80 and its separate male body 120. The male plug member 60 and separate female body 100 are shown rotated back into alignment so that the protrusions 121 and recesses 101 are now axially aligned and partially engaged with each other. The locking member 86 is still forced into the open position shown due to contact between the cam lobe 88 and the leading circular plug diameter 61. This allows partial engagement of the recesses 101 with the protrusions 121 while the locking members 86 remain open. This way the user can focus on engaging the protrusions 121 with the recesses 101 with the locking members in the same position as when the male plug member 60 and female socket member 80 were initially engaged as shown in FIG. 10B.

FIG. 10D shows the male plug member 60 with its separate female body 100 fully engaged axially with the female socket member 80 and its separate male body 120 so that the leading end 67 on the male plug member 60 is in contact with the sealing member 87 inside the female socket member 80. The locking arrangement includes a plurality of circumferentially spaced locking members 86 in respective side openings 84 of the female socket member 80 which can now be rotated about their pivot pins 89 for movement radially inward towards the axis 10 of the female socket member so that the cam lobe 88 of the respective locking member 86 pushes on a portion of the male plug member, of the curved peripheral groove 63, to bring the female socket member and male plug member into locking engagement with each other and thereby compress the sealing member 87 with the male plug member leading end 67 thereby completing the assembly of the camlock coupling.

The sealing member 87 is located separate from the cooperating components so that the cooperating components do not interfere with the action of the sealing member.

The protrusions 121 and recesses 101 are visible on the outer cylindrical surface 128 of the separate male body 120 and on the outer cylindrical surface 108 of the separate female body when the male plug member 60 and the female socket member 80 are connected and when they are separated so as to ensure alignment when relative movement is undertaken.

An identification means 109 is provided on separate female body 100 and an identification means 129 is provided on separate male body 120 for identifying the type of the fluid corresponding to the specific configuration of the recesses and protrusions.

Advantages of this embodiment include;

A separate female body and a separate male body that is easily installed and removed on a respective male plug member and female socket member permits fuel specific tagging of camlock couplings and related fittings to prevent fuel mixes or crossovers. A separate female body or a separate male body with a fuel specific configuration of the recesses and protrusions is also referred to as a tag ring in the discussion that follows.

Commercially available male plug members 60 with existing lugs and embossed lettering features can be configured with a fixed separate female body 100 without modifying the male plug member in any way.

Commercially available female socket members 80 can be configured with a fixed separate male body 120 without modifying the female socket member in any way.

Figure 11:
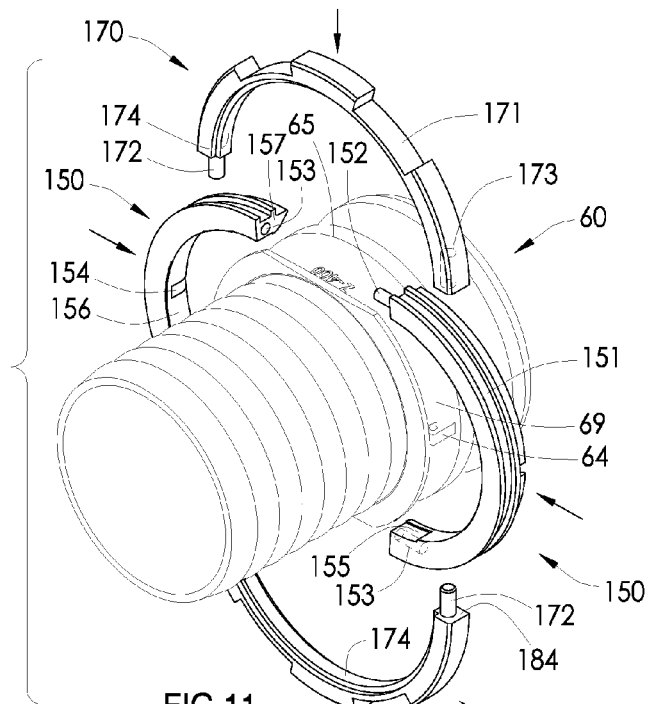
FIG. 11 through FIG. 15 shows a male plug member configured with a rotatable separate female body assembled onto a fixed inner stationary ring portion.
Figure 15:
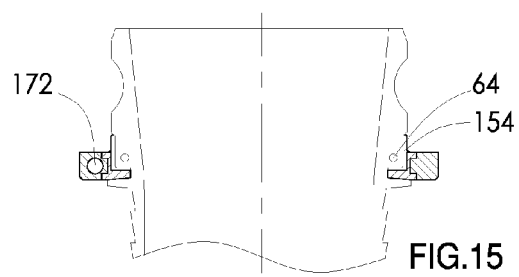
Figure 24:
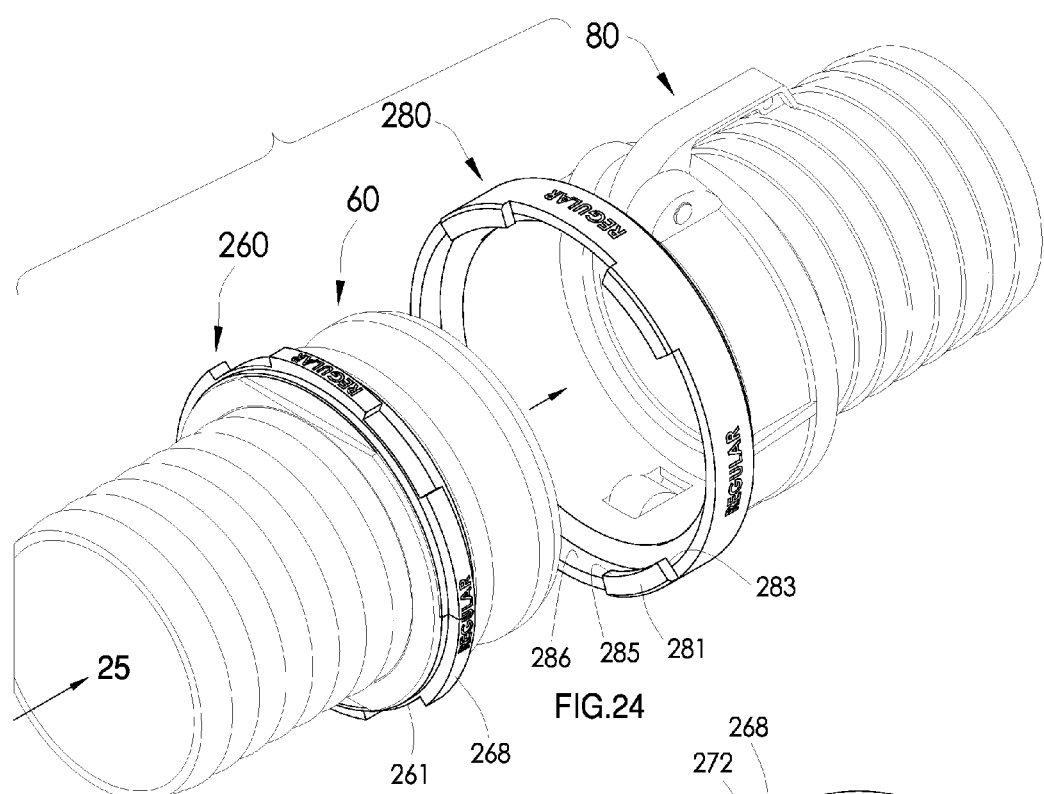
Figure 25:
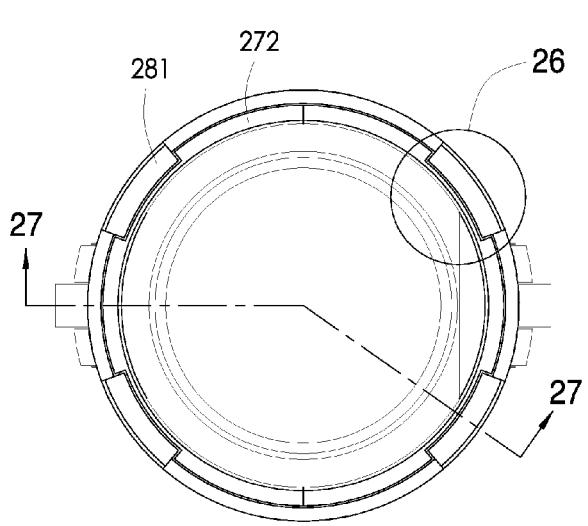

FIG. 11 though FIG. 15 shows an additional embodiment of the male plug member 60 with rotatable separate female body portions 170 mounted to inner stationary ring portions 150. In the following description when two separate female body portions are assembled together so as to form a single separate female body it will simply be referred to as a separate female body using the same reference number 170 and 150 as the individual separate female body portions. The rotatable separate female body 170 includes recesses 171 that are identical to recesses 101 (see FIG. 1) so that separate female body 170 and 100 can be used interchangeably with a female socket member 80 configured with a separate male body 120.

FIG. 11 shows an exploded view of the inner stationary ring portions 150 prior to assembly to the male plug member 60. Two inner stationary ring portions 150 each with a generally annular shape 156 with lug recess 154 and lettering recess 155 that are shaped and arranged to snuggly mount to male plug member 60 with a generally annular groove 69 with annular discontinuities defined by the protruding lug 64 and the embossed lettering 65 such that rotation of the inner stationary ring 150 relative to the male plug member 60 is not possible. The two inner stationary ring portions 150 are joined by bonding the alignment pins 152 in the alignment holes 153 so that mating surfaces 157 are brought into contact with each other. The outside diameter of the inner stationary ring 150 includes an annular outer groove 151 to retain and allow rotation of the rotatable separate female body 170.

FIG. 11 also shows an exploded view of the rotatable separate female body portions 170 prior to assembly to the inner stationary ring 150. The rotatable separate female body portions 170 are joined by bonding the alignment pins 172 in the alignment holes 173 so that mating surfaces 184 are brought into contact with each other. Two rotatable separate female body portions 170 each with an inner annular rib 174 is shaped and arranged to mount to the annular outer groove 151 in the inner stationary ring 150. The rotatable separate female body 170 carries the recesses 171 for mating with a female socket member 80 configured with a separate male body 120 (see FIG. 2).

Figure 12:
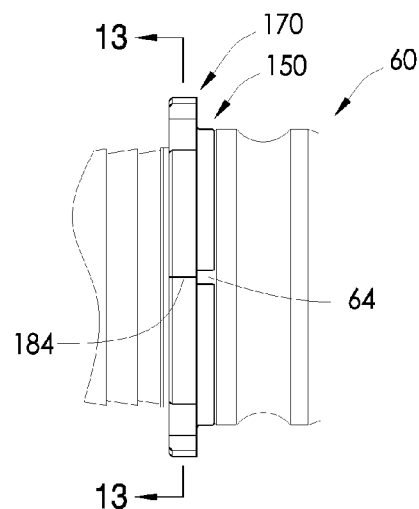

FIG. 12 is a side view of the inner stationary ring 150 and the rotatable separate female body 170 assembled to the male plug member 60 showing the mating surfaces 184 of the rotatable separate female body portions 170 in contact with each other.

Figure 13:
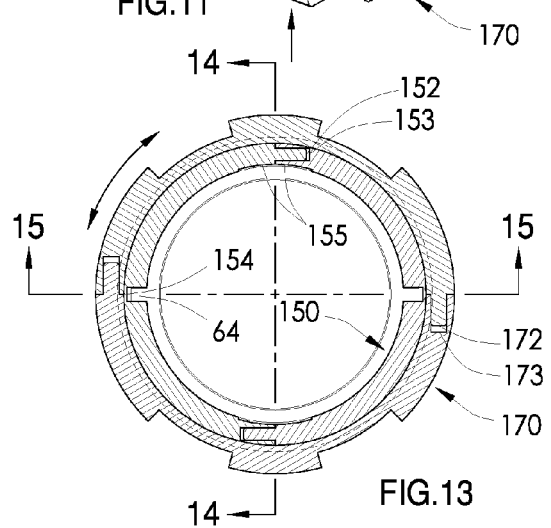

FIG. 13 is a cross section of the inner stationary ring 150 and the rotatable separate female body 170 assembled to the male plug member 60 showing engagement of the alignment pins 152 & 172 with their respective alignment holes 153 & 173. The inner stationary ring portions 150 are bonded together at the pins 152 and holes 153 and the mating surfaces 157. If a stronger bond is desired the generally annular shape 156 can also be bonded to the generally annular groove 69 on the male plug member 60. The rotatable separate female body portions 170 are bonded together at the pins and holes 172 & 173 respectively and at the mating surfaces 184.

Figure 14:
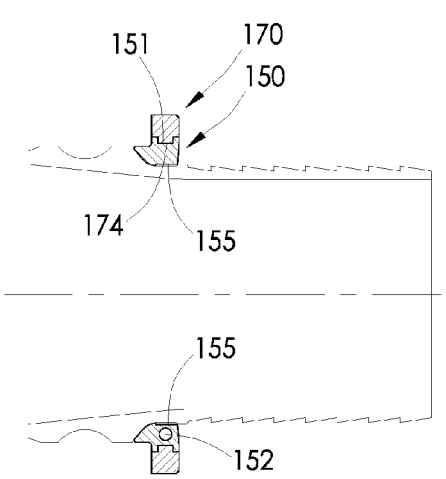

FIG. 14 is a cross section through the lettering recesses 155 showing one alignment pin 152. Also shown is engagement between the inner annular rib 174 and the annular outer groove 151 where relative rotation between these features is permitted so that the rotatable separate female body 170 may freely rotate about the inner stationary ring 150.

FIG. 15 is a cross section through the lug 64 and lug recesses 154 showing one alignment pin 172.

Advantages of this embodiment include;

Male plug members 60 with existing lugs and embossed lettering features can be configured with a separate female body which allows rotation where such rotation would normally be prevented by such features.

Once assembled the rotatable separate female body 170 is free to rotate relative to the inner stationary ring 150 fixed to the male plug member 60. This allows the rotatable separate female body 170 to be rotated prior to axial assembly with a female socket member 80 configured with a separate male body 120 (not shown, see FIG. 2).

Relative rotation of the rotatable separate female body 170 can also be undertaken after engagement of the protrusions 121 and recesses 171 by rotating either the male plug member 60 or female socket member 80 when partially or fully assembled to each other but before the locking members 86 are engaged.

To reconfigure the male plug member 60 for different configuration of the recesses (i.e. for another fuel) only the rotatable separate female body 170 needs to be replaced, the inner stationary ring 150 can be left in place permanently.

FIG. 16 though FIG. 20 shows a male plug member 60A that is identical to male plug member 60 (see FIG. 1) except that the lug 64 and embossed lettering 65 have been removed either in the casting process or machined off so as to provide a smooth uninterrupted generally annular groove 69. The embossed lettering can be moved to an alternate location on the male plug member such as the hose side of the hose stop flange 66. The lug (not shown) can also be moved to the hose stop flange or could be formed into the back surface 207 of the separate female body portions 200. The rotatable separate female body portion 200 includes recesses 201 that are identical to recesses 101 (see FIG. 1) so that separate female bodies 200 and 100 can be used interchangeably with a female socket member 80 configured with a separate male body 120. The rotatable separate female body portion 200 includes an generally annular shape 206 that is shaped and arranged to fit the generally annular groove 69 with approximately 0.15 mm of radial clearance between these surfaces so that the rotatable separate female body can rotate freely around the male plug member 60A on generally annular groove 69. To ensure the rotatable separate female body 200 does not rotate too easily and to ensure it stays in its manually preset rotational orientation prior to assembly to a female socket member 80 configured with a separate male body 120, an o-ring or other rotational restriction means 209 can be provided to create some light resistance to rotation. A nitrile or similar o-ring 209 provides resistance to rotation by being lightly squeezed between the base of the o-ring groove 212 and the cylindrical portion of the generally annular groove 69.

The rotatable separate female body portions 200 also illustrate an alternate means to fasten the rotatable separate female body portions together using screws 210. Both rotatable separate female body portions 200 are identical and each includes a counterbored hole 202 and a threaded hole 203 sized to suit the screws 210. The two rotatable separate female body portions 200 are aligned for assembly onto male plug member 60A as shown in FIG. 16. The counterbored hole 202 includes an alignment counterbore 205 that mates with an alignment boss 204 on the second rotatable separate female body portion 200 to assist with alignment of the two tag ring portions 200 prior to installation of the screws 210.

FIG. 17 is a side view of the rotatable separate female body 200 assembled to the male plug member 60A showing the mating surfaces 214 in contact with each other.

FIG. 18 is a cross section of the rotatable separate female body 200 assembled to the male plug member 60A showing engagement of the alignment bosses 204 and alignment counterbores 205 with screws 210 installed to hold the rotatable separate female body 200 together.

FIG. 19 is a cross section showing the close fit and substantially matching profile between the generally annular shape 206 and the generally annular groove 69 with the o-ring or rotational restriction means 209 shown.

FIG. 20 is a cross section through the screws 210 showing the cylindrical neck 211 with the same outside diameter as the circular plug diameters 61 and 62. To permit assembly of a female socket member 80, the cylindrical neck 211 can be smaller in diameter but must be no larger in diameter than the circular plug diameters 61 and 62.

Advantages of this embodiment include;

The rotatable separate female body 200 is free to rotate relative to the male plug member 60A. This allows the rotatable separate female body 200 to be manually rotated prior to axial assembly with a female socket member 80 configured with a separate male body 120 (not shown, see FIG. 2).

No separate inner stationary ring is required to permit rotation of the separate female body. This permits rotation with fewer parts and assembly steps and will therefore be lower in cost.

Relative rotation of the rotatable separate female body 200 can also be undertaken after engagement of the protrusions 121 and recesses 201 by rotating either the male plug member 60A or female socket member 80 when partially or fully assembled to each other but before the locking members 86 are engaged.

Simple two piece rotatable separate female body that is easily assembled and disassembled with screws to permit easy configuration and reconfiguration of a male coupler.

Light rotational resistance of the rotatable separate female body is provided by the o-ring 209 to ensure the rotatable separate female body remains in place and does not rotate around the male plug member without a small manual twisting force being applied.

FIG. 21 through FIG. 23C shows an additional embodiment that has a rotatable separate female body 220 having recess holes 221 and a separate male body with pins 240 having protrusions pins 241. The protrusions 241 and recesses 221 are formed on the leading surfaces 252 and 233 of the separate male body 240 and separate female body 220 respectively. This means the protrusions and recesses are separate from and contained within the outside diameter of the outer cylindrical surfaces 248 and 228 respectively.

FIG. 23A shows the X or Diesel fuel configuration of the protrusions and recesses which is also shown by way of example in FIG. 21 and FIG. 22.

FIG. 23B shows the Y or Regular fuel configuration of the protrusions and recesses.

FIG. 23C shows the Z or Premium fuel configuration of the protrusions and recesses.

Advantages of this embodiment include;

The outer cylindrical surfaces 248 and 228 of the tag rings protect the protrusions and recesses from damage when hoses and other fittings configured with these tag rings are dragged or dropped on the ground. The outer cylindrical surfaces 248 and 228 will take the majority of the wear and damage thereby protecting the protrusions 241 and recesses 221.

FIG. 24 through FIG. 27F shows an embodiment that uses a smaller separate female body with reduced diameter 260 with a reduced diameter and having recesses 261 that is bonded to the male plug member 60 and a larger separate male body 280 having overhanging protrusions 281 that is bonded to a female socket member 80. This configuration permits relative rotation of the coupling halves and protection of the separate female body by the separate male body after assembly. The separate female body with reduced diameter fits inside of the separate male body after assembly so that the separate female body is protected from damage caused by dragging or dropping the assembled coupling. To achieve this, the overhanging protrusions 281 must bypass the recesses 261 after initial engagement of the recesses 261 and protrusions 281 which is required for assembly to be undertaken. This allows relative rotation of the two coupling halves after complete axial assembly but prior to activating the locking members 86 since the protrusions 281 are no longer restricted rotationally by the recesses 261.

Figure 26:
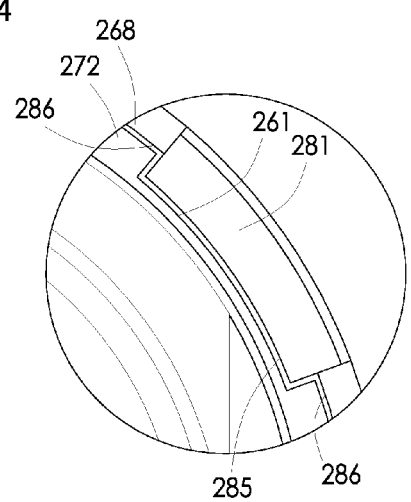

FIG. 26 shows a detailed view of one protrusion 281 and one recess 261 in axial and rotational alignment for assembly. It can be seen that the inner cylindrical surface 286 of the larger separate male body 280 is a larger diameter that the outer cylindrical surface 268 of the smaller separate female body 260 and also that the inner cylindrical surface of the protrusion 285 is a larger diameter than the cylindrical surface of the recess 261 thereby allowing the separate female body to slide inside of the separate male body when the protrusions and recesses match.

FIG. 27A shows the coupling halves separated but in axial and rotational alignment ready for assembly.

FIG. 27B shows the coupling halves aligned axially but with the male plug member rotationally misaligned so that the leading surface 273 of the smaller separate female body 260 is in contact with the outer most surface of the protrusion 281. In this axial position the locking members 86 is forced into the open position shown by contact between the cam lobes 88 and the leading circular plug 61. No further axial assembly is possible until matching sets of protrusions and recesses are brought into rotational alignment with each other.

FIG. 27C shows matching sets of protrusions and recesses after they have been brought into rotational alignment and are now partially engaged with each other. No relative rotation of the coupling halves is possible while the protrusions and recesses are engaged with each other as shown. FIG. 27E shows an enlarged detail view of one protrusion and recess engaged with each other.

FIG. 27D shows the assembled coupling with the locking members in the closed and locked position with the protrusions and recesses in alignment with each other. FIG. 27F shows an enlarged detail view of the protrusions and recesses in alignment. It can also be seen that the recess has bypassed the protrusion such that the trailing surface 272 of the smaller separate female body 260 has moved past the inside surface of the protrusions 283 of the larger separate male body 280. Relative rotation of the coupling halves, if desired, is now possible by releasing or opening the locking members 86 since the protrusions and recesses are no longer engaged with each other.

Advantages of this embodiment include;

Relative rotation of the coupling halves is possible after assembly but prior to engagement of the locking members when the larger separate male body is bonded to the female socket member and the smaller separate female body bonded to the male plug member. This type of rotation after assembly can be used for drop elbows at service stations where it will be useful to rotate the drop elbow towards the tanker trailer to facilitate the required hose connections.

The smaller separate female body with reduced diameter fits inside of the larger separate male body after assembly so that the smaller separate female body is protected from damage caused by dragging or dropping the assembled coupling.

FIG. 28 through FIG. 31 shows an embodiment of a separate male body 780 mounted to a bottom loading head or female socket member 380 and separate female body portions 700 mounted to an API valve or male plug member 300.

The separate male body 780 configured with protrusions 781 is mounted with fasteners 785 to the leading end 384 of the outer collar 386 which has been drilled and tapped with threaded holes 385. The inner cylindrical surface 783 of the separate male body is slightly larger than the outside diameter of the inner collar 387 to permit relative movement of the inner and outer collars required for the bottom loading head locking members 388 located in side openings 389 of the inner collar 387 to latch on to the API valve nose ring or annular flange 301.

The separate female body portions 700 configured with recesses 701 are first assembled around the API valve in front of the mounting surface 306 but behind the nose ring 301 by engaging the alignment pins and holes 702 and 703 and then mounting the assembled separate female body 700 with fasteners 705 to the mounting surface 306 which is drilled and tapped with mounting holes 305. The separate female body 700 must be split in two portions in this embodiment since the inner cylindrical surface 709 has a smaller diameter that the outside diameter of the nose ring or annular flange 301. The separate female body 700 is notched 704 to fit around the protruding surfaces 304 so that the front surface 710 of the separate female body 700 is flush with the protruding surfaces 304 of the API valve or male plug member 300.

Advantages of this embodiment include; Semi-permanent and tamper resistant method of attaching the separate male body and separate female body using fasteners.

Fixed rotational orientation of both the separate male body 780 and separate female body 700 that prevents rotation relative to the bottom loading head 380 and API valve 300 they are fastened to. Rotation of the separate male body 780 and separate female body 700 is not required since the API valve is fixed to the tanker trailer in a specific orientation and the bottom loading head is attached to a loading arm that permits rotation of the bottom loading head and attached separate male body so that the protrusions 781 can be easily aligned with the recesses 701.

Protection of the leading surface 384 of the bottom loading head 380 from bumps or contact with other equipment or the API valve 300 with separate female body 700 fastened in place.

Optional sensor means defined by sensor 786 with sensor lead wire 787 is mounted on the separate male body 780 to detect the presence of a contact or magnet 706 mounted on the separate female body 700 so as to ensure both a mechanical and electrical interlock between the bottom loading head and the API valve before fuel can be dispensed through the assembly. That is the sensor will not permit fuel to be released unless the separate male body and separate female body are mated to each other.

Figure 32:
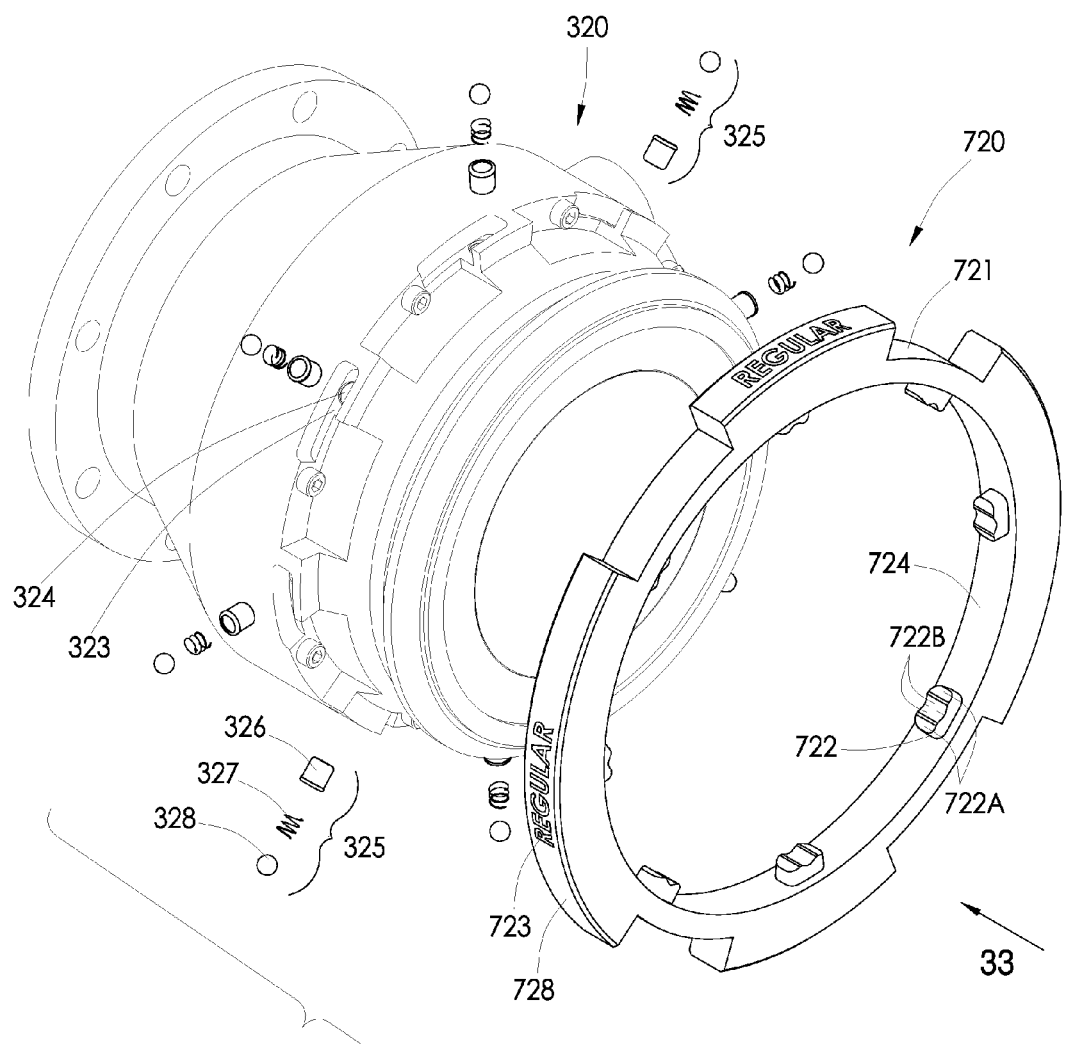

FIG. 32 through FIG. 34 shows an embodiment of a separate female body with bayonet mount 720 mounted to an API valve or male plug member 320 with a bayonet mounting arrangement.

The separate female body 720 is a single one piece ring with recesses 721 located and recessed into the outer cylindrical surface 728. The inner cylindrical surface 724 includes one or more bayonet positioning blocks 722 protruding radially inwards from the inner cylindrical surface 724.

The API valve 320 includes one or more concentric machined bayonet grooves 323 terminating with a mounting hole 324 shaped and arranged to accept spring plunger assembly 325 consisting of a cup 326, spring 327 and ball 328.

FIG. 33A shows an isometric and end view of the separate female body 720 in axial and rotational alignment with the API valve or male plug member 320 prior to assembly of the separate female body such that each of the positioning blocks 722 are aligned for engagement with the start of each of the machined bayonet grooves 323.

FIG. 33B shows an isometric and end view of the separate female body 720 axially installed on to the API valve or male plug member 320 such that each of the positioning blocks 722 are in axial engagement with the start of each of the machined bayonet grooves 323 prior to rotation of the separate female body to its locked position.

FIG. 33C shows an isometric and end view of the separate female body 720 rotated the arc length of the bayonet groove towards the mounting hole 324 to complete the installation of the separate female body onto the API valve or male plug member 320 such that each of the positioning blocks 722 inner angled ramps 722B are now in engagement with the ball 328 of the spring plunger assembly 325. FIG. 34 is an enlarged break away section view showing the ball 328 resting between the inner angled ramps 722B with the spring 327 providing the force on the ball 328 required to hold the separate female body in position as shown.

Advantages of this embodiment include;

A separate female body that is easy to install and remove by hand that permits quick tagging of API valves prior to loading fuel.

Multiple female tag rings or separate female bodies for each fuel configuration are easily carried by the tanker trailer so that trailer compartments communicating with their associated API valves are easily configured for a particular fuel or reconfigured for another fuel by simply removing and installing a tag ring configured and labelled for the desired fuel to be loaded.

Self-locking bayonet mounting holds the ring in position axially and rotationally when the spring plungers on the API valve are engaged.

Tag ring is symmetrical front to back so that it can be installed with the identification means 723 facing in either direction so there is no user confusion on which direction to install the tag ring.

Purposely alternating the installation of the tag ring helps distribute wear on the positioning blocks 722 by alternating initial engagement of the positioning block lead-in angled ramps 722A with the spring plunger assemblies 325.

Figure 35:
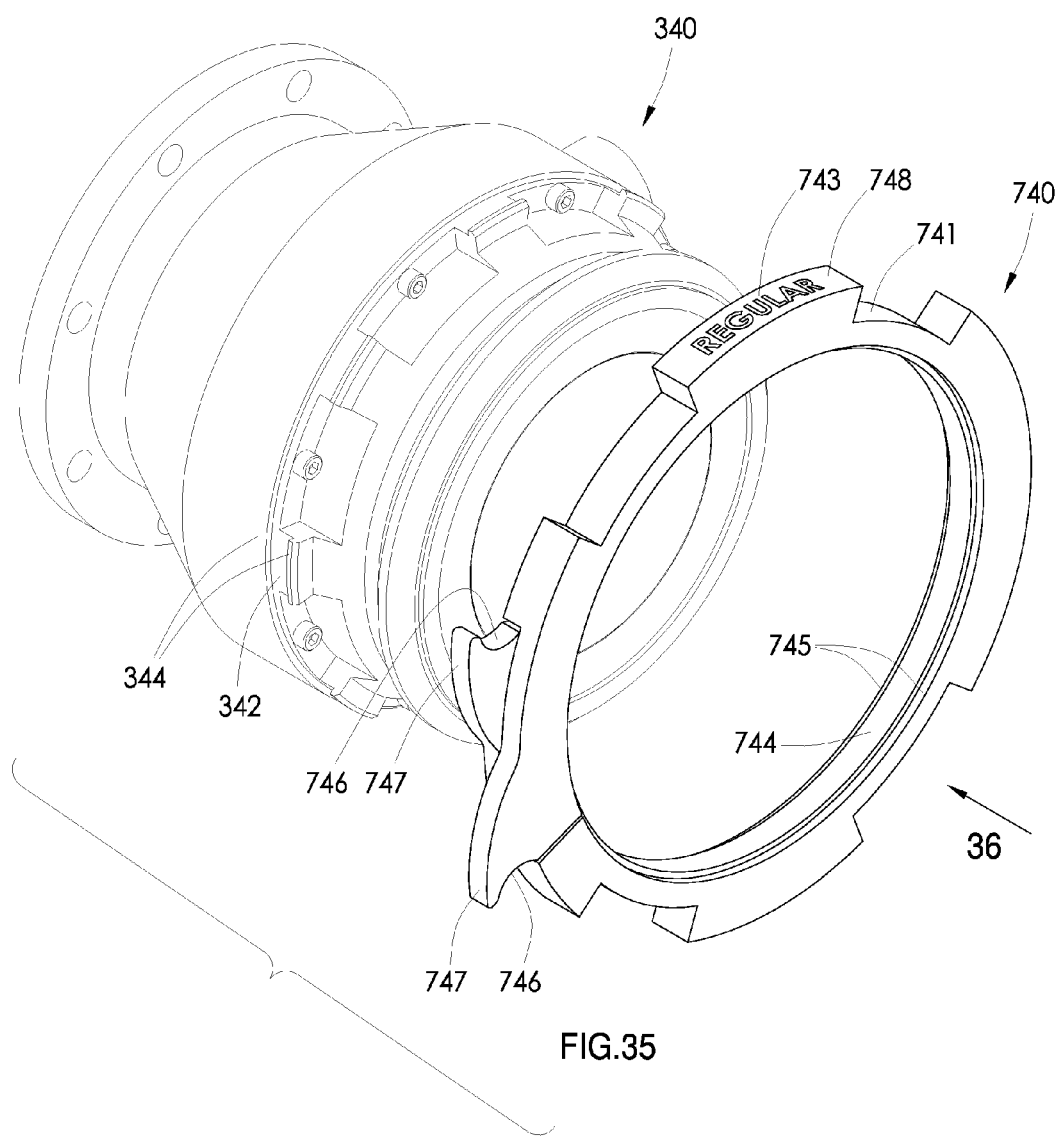
Figure 36A:
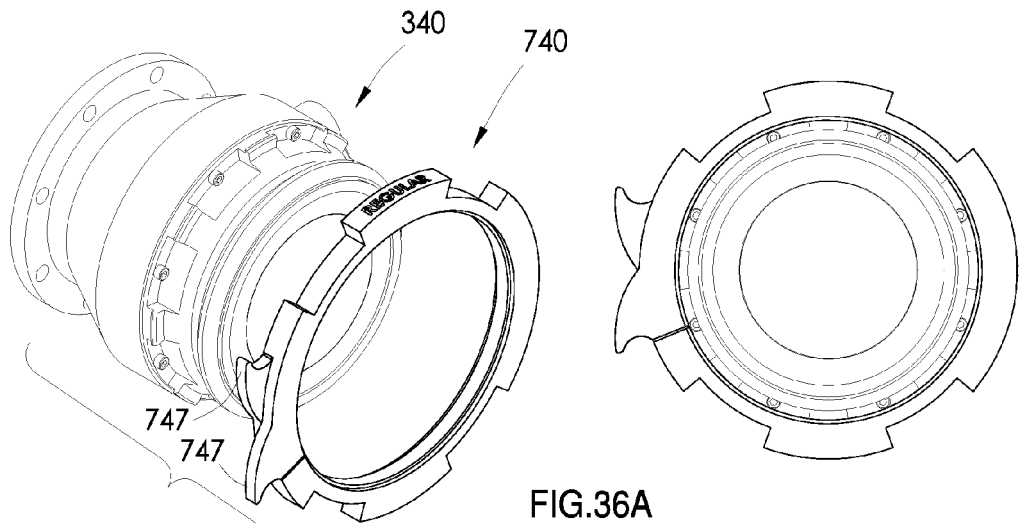
FIG. 36A is an isometric and end view showing the separate female body with an expandable diameter aligned with the API valve prior to axial assembly of the separate female body with expandable diameter.
Figure 36B:
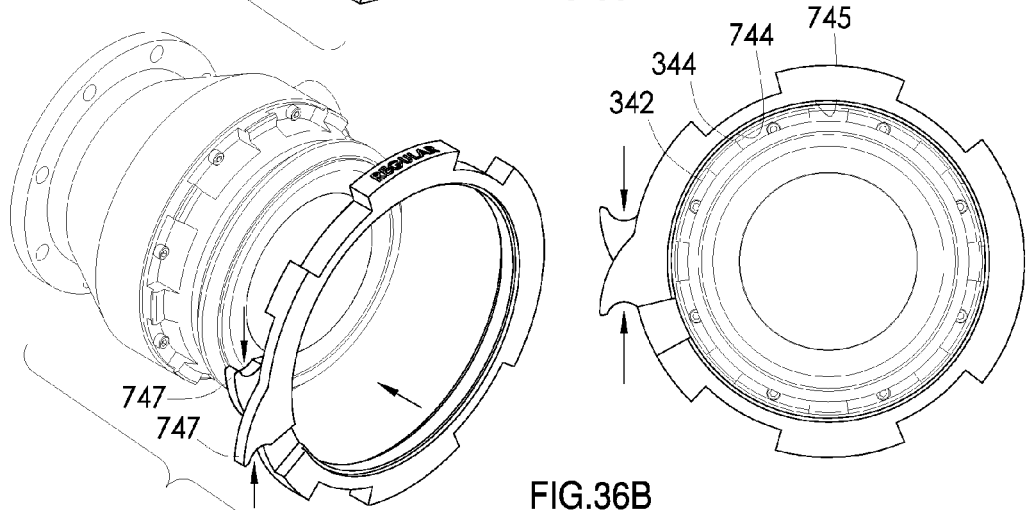
FIG. 36B is an isometric and end view showing the separate female body with an expandable diameter, with its diameter shown expanded, prior to axial assembly on to the cooperating mounting groove of the API Valve.
Figure 36C:
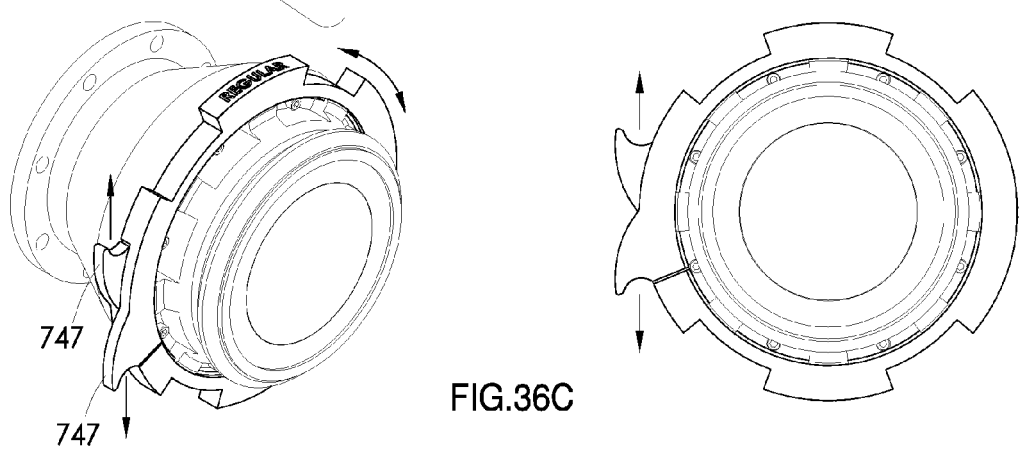

FIG. 35 through FIG. 36C shows an embodiment of a separate female body 740 with an expandable diameter mounted to an API valve or male plug member 340 with an annular groove.

The separate female body 740 is a single one piece flexible and expandable ring with recesses 741 located and recessed into the outer cylindrical surface 748. The inner cylindrical surface 745 includes an inner annual rib 744 protruding radially inwards from the inner cylindrical surface 745.

The API valve or male plug member 340 includes an annual groove 342 machined into the outer cylindrical surface 344.

FIG. 36A shows an isometric and end view of the separate female body 740 in axial and rotational alignment with the API valve or male plug member 340 prior to assembly of the separate female body 740.

FIG. 36B shows an isometric and end view of the separate female body 740 with finger levers 747 squeezed together by applying a force on the finger saddles 746 with the thumb and index finger. Squeezing the finger levers 747 together expands the diameter of the separate female body 740 such that the inner annular rib 744 is larger than the outside diameter of the outer cylindrical surface 344 so that the separate female body 740 can be moved axially so that the inner annular rib 744 is positioned directly over the annual groove 342.

FIG. 36C shows an isometric and end view of the separate female body 740 with the inner annual rib 744 engaged with the annular groove 342 after releasing the finger levers 747. The separate female body 740 is manufactured so that the inner cylindrical surface 745 has a slightly smaller diameter that the outer cylindrical surface 344 on the API valve 340. This forces the inner cylindrical surface 745 to exert pressure on the outer cylindrical surface 344 to ensure a tight fit and to ensure enough frictional force is generated between surfaces 344 and 745 so that the separate female body stays fixed in the rotational orientation it was left in when the finger levers 747 are released.

Advantages of this embodiment include;

A separate female body that is easy to install and remove by hand that permits quick tagging of API valves prior to loading fuel.

The API valve only requires a very simple machined groove 342 to facilitate the mounting of the separate female body 740.

Multiple female tag rings or separate female bodies for each fuel configuration are easily carried by the tanker trailer so that trailer compartments communicating with their associated API valves are easily configured for a particular fuel or reconfigured for another fuel by simply removing and installing a tag ring configured and labelled for the desired fuel to be loaded.

The tag ring can be installed and reoriented in any desired rotational orientation on the API valve by applying light pressure on the finger saddles 746 with thumb and forefinger while simultaneously rotating the tag ring.

Tag ring is symmetrical front to back so that it can be installed with the identification means 743 facing in either direction so there is no user confusion on which direction to install the tag ring.

Figure 37:
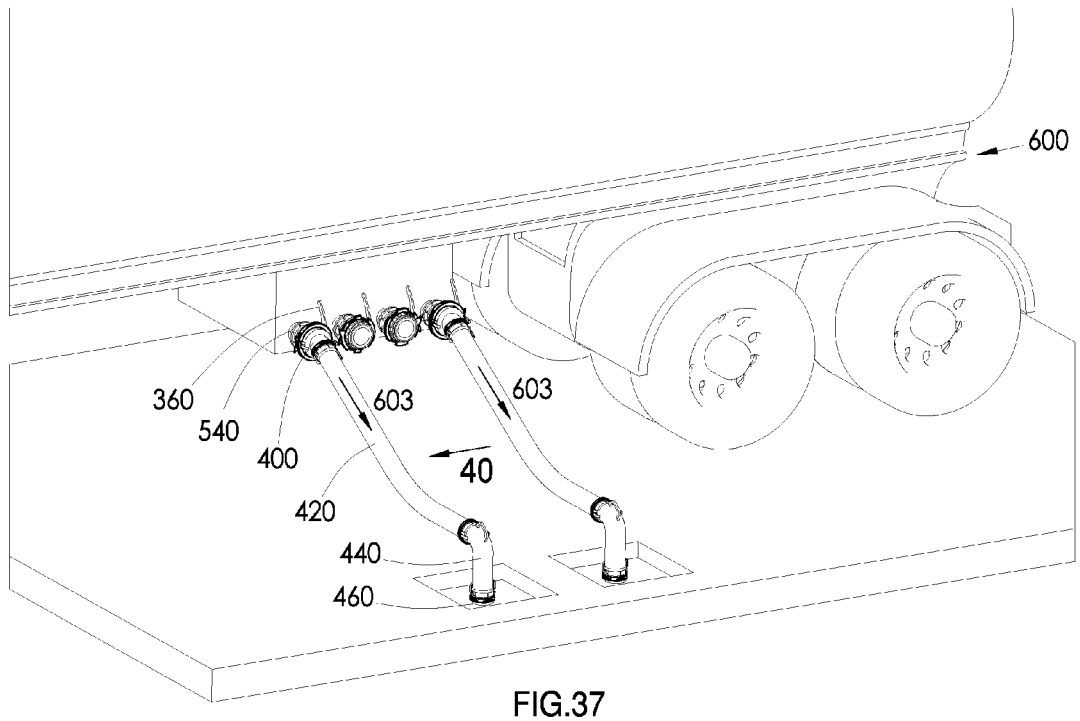
FIG. 37 is an isometric view of a tanker trailer configured with combined loading and unloading API valves with transfer hoses and related fittings connecting the tanker trailer API valves to the top seal adapter on the underground fuel storage tanks.

FIG. 37 is an isometric view of a tanker trailer 600 configured with combined loading and unloading API valves 360 with drop adapter 400, transfer hose 420 and drop elbow 440 connecting the tanker trailer API valves 360 to the top seal adapter 460 on the underground fuel storage tanks to facilitate the discharge of fuel 603 from the tanker trailer to the underground fuel storage tank.

Figure 38:
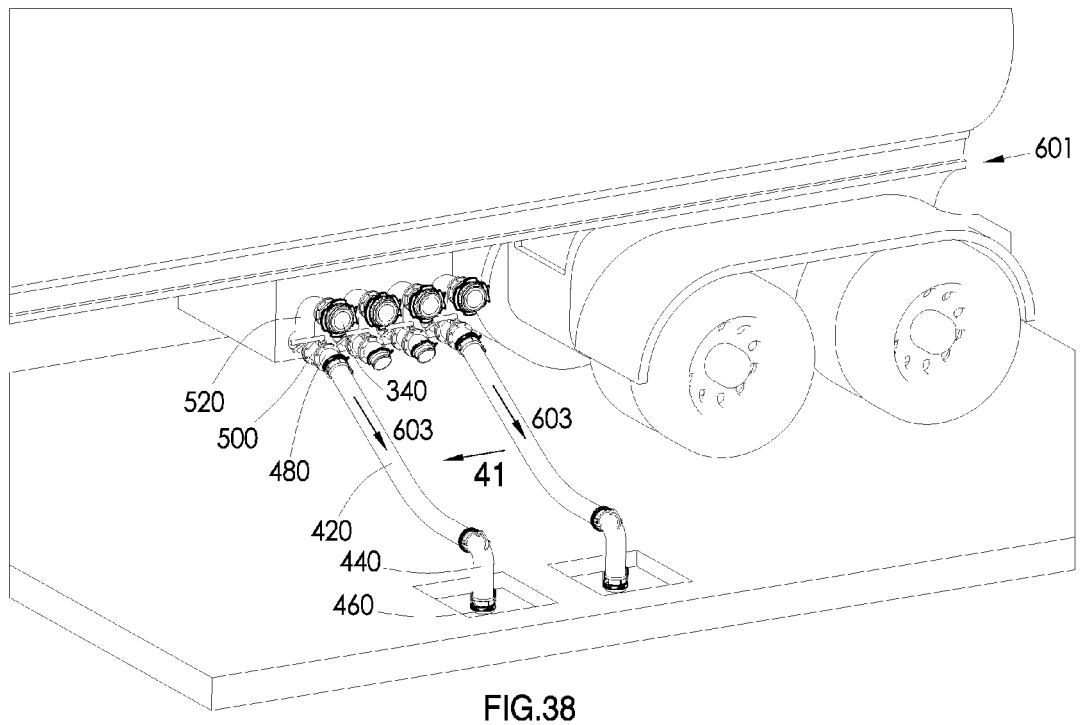
FIG. 38 is an isometric view of a tanker trailer configured with separate loading API valves and unloading valves with transfer hoses and related fittings connecting the tanker trailer unloading valves to the top seal adapter on the underground fuel storage tanks.

FIG. 38 is an isometric view of a tanker trailer 601 configured with separate loading API valves 340 and unloading valves 500 with hose elbow 480, transfer hose 420 and drop elbow 440 connecting the unloading valves 500 to the top seal adapter 460 on underground fuel storage tanks to facilitate the discharge of fuel 603 from the tanker trailer to the underground fuel storage tank.

The tanker trailer 600 or 601 will be parked near to the underground fuel storage tanks that each terminate in a top seal adapter 460. The tanker trailer 600 or 601 is divided into separate compartments that can each carry different fuels such as Diesel, Premium and Regular in a single delivery to a gas station. Similarly, a typical gas station has multiple underground fuel storage tanks that can receive any or all of these fuels from a single tanker trailer delivery.

The industry currently relies on procedures, manual dog tagging and color coding systems to help prevent incorrect connections between the tanker trailer and the underground storage tanks. Even with these procedures and systems in place it is not uncommon for fuel mixes or crossovers to occur. A premium gasoline and regular gasoline crossover will result in a costly downgrade of the premium fuel along with the time and expense to pump the downgrade into the regular grade storage tank. A diesel and gasoline mix is far more serious and expensive to rectify since the fuel is no longer useable as either gasoline or diesel and must be pumped out of the storage tank and disposed of. Diesel and gasoline crossovers that end up in vehicles can cause severe damage to fuel systems and engines and lead to expensive repairs along with a loss of reputation in the marketplace for the oil company that can result in further lost revenue. Mixes can also result in motorist and boaters becoming stranded with engine failure which can be a serious safety issue and a potential liability concern for oil companies.

Figure 39:
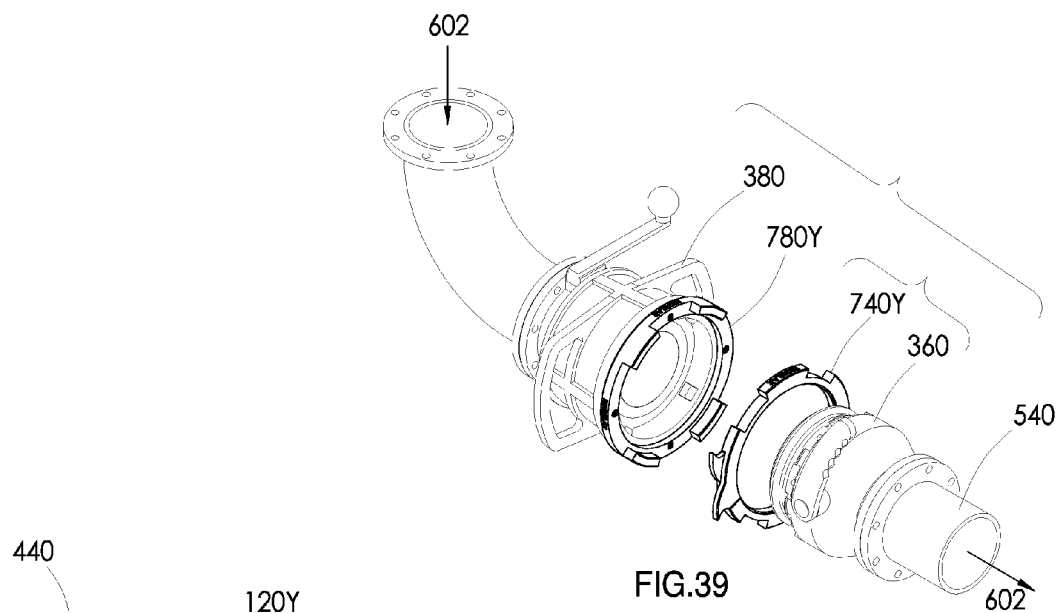
FIG. 39 is an isometric exploded view of a single tanker trailer load/unload pipe configured with a loading and unloading API valve. A bottom loading head is shown connecting to the API valve for loading fuel into the tanker trailer.

FIG. 39 shows an isometric exploded view of a bottom loading head 380 used to load one tanker trailer 600 compartment through API valve 360 which communicates with said tanker trailer compartment (not shown) through load/unload pipe 540. The loading of tanker trailers takes place at fuel depots or terminals where bulk storage of fuels is bottom loaded into tanker trailers for distribution to service stations as shown in FIG. 37. Prior to loading a tanker trailer compartment with Regular fuel the API valve 360 communicating with that compartment is tagged with a fuel specific female tag ring 740Y representing Regular fuel. The Regular fuel loading arm (not shown) at the fuel terminal terminates in a bottom loading head 380 that is configured with a male tag ring 780Y represent Regular fuel. The other bottom loading heads at the fuel terminal are permanently configured with male tag rings configured for the specific fuel to be dispensed such a Diesel 780X and Premium 780Z. The Diesel fuel 780X or Premium fuel 780Z male tag rings are not compatible and will not fit to the Regular fuel female tag ring 740Y so once a tanker trailer compartment's API valve is tagged with a fuel specific female tag ring only that particular fuel may be loaded through that API valve 360.

After tagging all the tanker trailer API valves and loading the associated fuel into the tanker trailer compartments the tag rings on the API valves are left in place on the API valves until the tanker trailer returns from delivering its fuel at which time the tag rings can either be left in place if the tanker trailer compartment is to be reloaded with the same fuel in the same compartments or, one or more tag rings on empty compartments can be changed to a different fuel specific female tag ring so that the tanker trailer compartment can be loaded with that particular fuel. The direction of fuel flow from the loading arm, through the bottom loading head 380 and then through the API valve 360 communicating with the tanker trailer compartment is indicated by flow arrow 602.

To ensure that an API valve has been tagged for a particular fuel the API valve female tag rings can also include a magnetic or mechanical target that must be detected by a sensor or switch on the male tag ring attached to the bottom loading head before fuel is permitted to flow through the loading arm and bottom loading head into the tanker trailer compartment. The switch or sensor communicates with the loading arm control system to only allow discharge of Regular fuel when the protrusions on the male tag ring 780Y match the recesses on the female tag ring 740Y after assembly of the bottom loading head on to the API valve.

A sensor or switch can also be used on bottom loading heads that discharge more than one fuel from a common loading arm by having a switch or sensor uniquely configured or mounted to detect the presence of a fuel specific female tag ring and only discharge the fuel represented by that female tag ring when it is installed on the API valve 360. In this case the bottom loading head would not require a fuel specific male tag ring since the switch or sensor on the bottom loading head 380 representing Regular fuel and communicating with the female tag ring 740Y would only permit discharge of Regular fuel through the loading arm. Similarly if female tag ring 740X was installed on the API valve 360 it would only communicate with the switch or sensor on the bottom loading head representing Diesel and would only permit the release of Diesel fuel.

Figure 40:
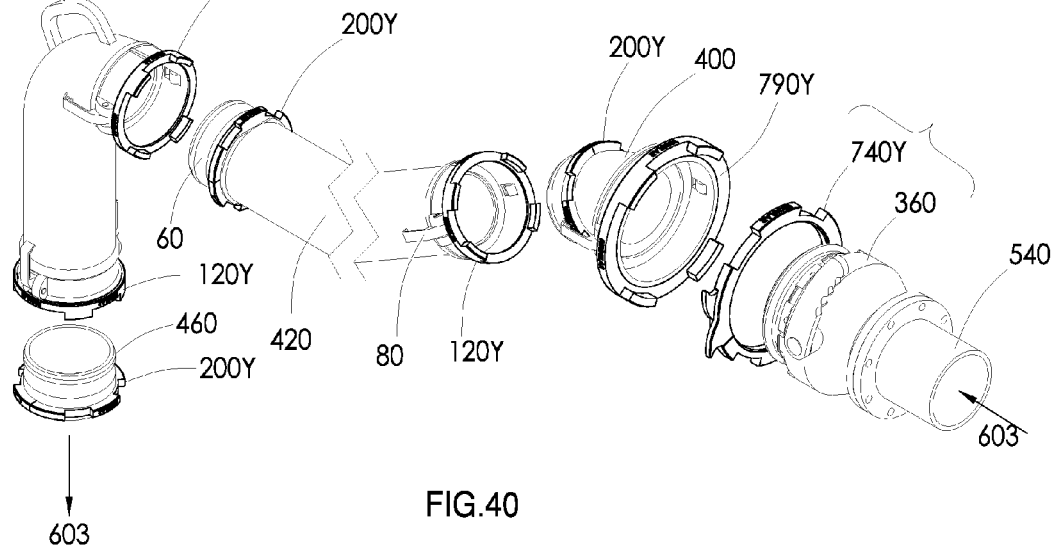
FIG. 40 is an isometric exploded view of a single tanker trailer load/unload pipe configured with a loading and unloading API valve. A transfer hose and related fittings are shown connecting the API valve to the top seal adapter on the underground fuel storage tank for unloading fuel.

FIG. 40 is an isometric exploded view of a single combined loading and unloading API valve 360 with drop adapter 400, transfer hose 420 and drop elbow 440 connecting the tanker trailer API valves 360 to the top seal adapters 460 on the underground fuel storage tanks.

The API valve 360 is normally tagged with the desired fuel specific female tag ring 740Y prior to loading fuel into the tanker trailer and this tag is never removed and in fact can be locked to the API valve prior to loading fuel to prevent tampering or accidental removal after fuel is loaded. The female tag ring 740Y is shown separated in this view to illustrate that tagging of the API valve can also be undertaken immediately after loading fuel into the tanker trailer if tagging is only desired or required for delivering fuel. In this case previously established fuel loading procedures would remain in effect and the tagging ring would be an added step in the loading of each tanker trailer compartment.

It is important to note that the API valve tag ring 740Y is the only tag ring that is removable in normal use since it determines and labels the fuel contained in the tanker trailer compartments. The bottom loading head 380 in FIG. 39 along with the drop adapter 400, hose 420, drop elbow 440 and top seal adapter 460 in FIG. 40 are all pre-configured with the male and female tag rings shown. The drop adapter 400 has male tag ring 790Y on the female socket member end that interlocks with female tag ring 740Y on API valve 360. The drop adapter 400 also has female tag ring 200Y on its discharge or male plug member end that interlocks with the male tag ring 120Y on the female socket member 80 connected to the inlet or female socket member end of hose 420. The discharge or male plug member end of the hose has a female tag ring 200Y that interlocks with the male tag ring 120Y on the inlet or female socket member end of the drop elbow 440. The discharge or female socket member end of the drop elbow 440 has male tag ring 120Y that interlocks with the female tag ring 200Y on the male plug member end of the top seal adapter 460.

The tanker trailer carries drop adapters 400, hoses 420 and drop elbows 440 preconfigured with tag rings as shown in FIG. 40 specific for each fuel that the tanker trailer carries. That is if the tanker trailer delivers Diesel, Regular and Premium fuel it will carry at least one drop adapter, one hose assembly and one drop elbow configured for each of these fuels so that these are ready for use at the service station and so that only like configured fittings and hose are interchangeable with each other.

The top seal adapters 460 at the service station are permanently tagged with fuel specific female tag rings 200 representing the fuel that is to be stored in the underground storage tank. The top seal adapter 460 with the female tag ring 200 installed is backwards compatible with drop elbows that do not have male tag rings 120 attached. This allows service stations to install fuel specific female tag rings on all their top seal adapters without disrupting deliveries from tanker trailers which have not been changed over to the tag ring system. This allows fuel transport companies to gradually roll out this change with no disruption to deliveries.

The direction of fuel flow from the tanker trailer 600, through the API valve 360, drop adapter 400, hose 420, drop elbow 440 then through the top seal adapter 460 communicating with the underground storage tank is indicated by flow arrow 603.

Figure 41:
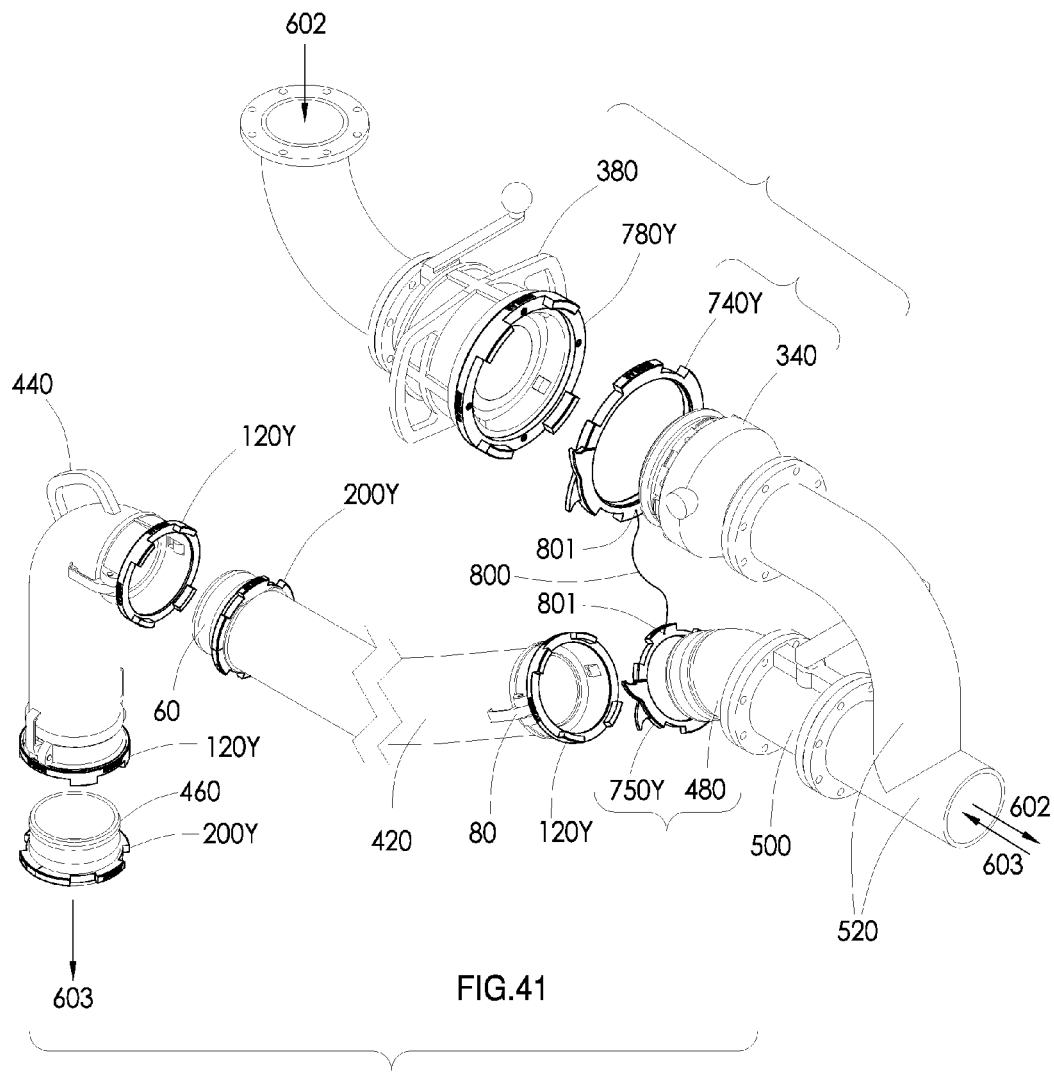
FIG. 41 is an isometric exploded view of a single tanker trailer load/unload wye pipe configured with a separate loading API valve and an unloading valve. A transfer hose and related fittings are shown connecting the unloading valve to the top seal adapter on the underground fuel storage tank for unloading fuel. A bottom loading head is shown connecting to the API valve for loading fuel into the tanker trailer at the fuel depot.

FIG. 41 is an isometric exploded view of a tanker trailer 601 configured with separate loading API valves 340 and unloading valves 500. The unloading valve 500 communicates with the top seal adapter 460 on the underground fuel storage tanks through hose elbow 480, transfer hose 420 and drop elbow 440. The loading API valve 340 communicates with the loading arm (not shown) at the fuel depot or terminal through the bottom loading head 380. The bottom loading head 380 is permanently attached to the loading arm at the terminal and remains at the terminal at all times. The hose 420 and drop elbow 440 are carried on the tanker trailer and used to discharge fuel at the service station. The bottom loading head 380 would not normally be used together with the hose 420 and drop elbow 440 as shown since these are separate operations that happen in different locations.

The main difference with tanker trailer configuration 601 as compared to tanker trailer configuration 600 is the separate loading and unloading valves that both need to be tagged with a removable fuel specific female tag ring. The API valve 340 is tagged with a fuel specific female tag ring 740Y corresponding to Regular fuel and the hose elbow 480 is also tagged with a fuel specific female tag ring 750Y corresponding to Regular fuel. It is important that the API valve 340 and hose elbow 480 that both communicate with the same compartment through loading/unloading wye pipe 520 on the tanker trailer both have tag rings configured for the same fuel as shown. To ensure there is no mix up, the tag rings for each type of fuel are paired together permanently with a lanyard 800 and lanyard fasteners 801 so that tag rings 740Y and 750Y are paired together to ensure a mix matched set of tag rings such as 740Y and 750X cannot be used together on a single loading/unload wye pipe 520. The tanker trailer will carry multiple pairs of removable tag rings for each type of fuel so that more than one tanker trailer compartment can be tagged for the same fuel.

The X, Y, Z recess and protrusion configurations and any other required configurations would be standardized industry wide for particular fuels. With a standard in place the first step would be to replace gas station tank top seal adapters with top seal adapters configured for a particular fuel with a female tag ring permanently installed. Since the system is backwards compatible with standard or non-configured camlock fittings there will be no interruption in fuel delivery service if tanker trailers are still operating without configured fittings and accessories. Tanker trailers typically carry multiple sets of hoses and fittings, one set for each fuel delivered. Therefore the quantity of hose and fittings carried by the tanker trailer is the same, only now they are configured for a particular fuel. There is no appreciable change in procedures for loading and unloading fuel except that there is now positive feedback in the form of the coupling not being able to mate together when a connection is attempted between say a Diesel configured female socket member and a Premium configured male plug member. Since a coupling with mismatched tag rings will not physically fit together the potential for fuel mixes or crossovers is prevented.

The invention claimed is:

1. A quick-disconnect coupling comprising:
   a male plug member;
   a female socket member defining an opening at a leading end into which a leading end of the male plug member can be inserted so that the male plug member is moved longitudinally of an axis of the female socket member into the opening to a locking position;
   the male plug member and female socket member defining a duct passing therethrough for communication of a fluid therebetween;
   a locking arrangement for locking the male plug member in the female socket member at the locking position;
   wherein the locking arrangement includes a plurality of circumferentially spaced locking members within a respective side opening of the female socket member for movement radially inwardly towards the axis of the female socket member into locking engagement with a portion of the male plug member;
   each locking member being pivotally connected to the female socket member for radially outward movement to disengage said locking members from said locking engagement with said portion of the male plug member;
   cooperating components provided on said female socket member and on said male plug member;
   said cooperating components comprising at least one protrusion provided on an outside surface of the female socket member and at least one recess provided on an outside surface the male plug member;
   said at least one protrusion having a predetermined length projecting longitudinally from the leading end of the female socket member and said at least one recess set back a predetermined distance longitudinally from the leading end of the male plug member;
   said cooperating components defined by said at least one recess and said at least one protrusion being cooperatively shaped and arranged to allow insertion of the male plug member into the female socket member to the locking position when said at least one recess and said at least one protrusion match;
   whereby the recess and the protrusion do not cooperate with the locking arrangement to hold the components connected but act as a restriction to allow the locking arrangement to engage only when the said at least one recess and said at least one protrusion match.

2. The coupling according to claim 1 wherein said cooperating components comprise a plurality of protrusions and a plurality of recesses at a predetermined spacing therebetween and wherein insertion of the male plug member into the female socket member to the locking position is allowed only when said predetermined spacing matches.

3. The coupling according to claim 1 wherein said protrusions and recesses are visible when the male plug member and the female socket member are connected and when they are separated so as to ensure alignment when relative movement is undertaken.

4. The coupling according to claim 1 wherein said male plug member has a peripheral groove or annular flange for engagement with the locking arrangement of the female socket member.

5. The coupling according to claim 1 wherein there is provided a sealing member for sealing between the male plug member and the female socket member at the locking position such that the sealing member is located separate from the cooperating components so that the cooperating components do not interfere with the action of the sealing member.

6. The coupling according to claim 1 wherein there is provided an identification means for identifying the type of the fluid corresponding to the specific configuration of the recesses and protrusions.

7. The coupling according to claim 1 wherein at least one of said at least one recess is provided on a separate female body portion and said at least one protrusion is provided on a separate male body portion with a mounting means for mounting said separate female body portion on the male plug member and said separate male body portion on the female socket member.

8. The coupling according to claim 7 wherein at least one of said separate male body portion and said separate female body portion has a generally annular shape for mounting engagement with a generally annular groove or flange provided on the outside surface of the respective one of the female socket member or male plug member and wherein rotation of the separate male body portion or the separate female body portion can occur around the axis relative to the respective one of the female socket member or male plug member.

9. The coupling according to claim 8 wherein said portion of the male plug member comprises a peripheral groove arranged to align with said locking members such that rotation of the male plug member can occur around the axis relative to the female socket member at the locking position while said locking members rotate freely around the peripheral groove to any selected angular position thereof;

whereby the male plug member may be manually rotated relative to the female socket member at the locking position, with the recesses and protrusions engaged, prior to activating the locking members to lock the coupling together.

10. The coupling according to claim 8 wherein a rotational restriction means is provided for retaining a manually preset rotational orientation between at least one of said separate male body portion and the female socket member and said separate female body portion and the male plug member.

11. The coupling according to claim 8 wherein said protrusions and recesses are visible when the male plug member and the female socket member are connected and when they are separated so as to ensure alignment when relative movement or rotation is undertaken.

12. The coupling according to claim 7 wherein at least one of said separate male body portion and said separate female body portion comprises a plurality of components for mounting on the respective one of the female socket member or male plug member.

13. The coupling according to claim 7 wherein at least one of said separate male body portion and said separate female body portion comprises an annular ring with expansion means such that the inner diameter of said annular ring can be enlarged to slide over the outside leading end of the male plug member or female socket member to engage a mating annular groove or flange on an outside surface of the respective one of the female socket member or male plug member when said expansion means is released.

14. The coupling according to claim 7 wherein at least one of said separate male body portion having a predetermined radial dimension that is larger than the outer leading end dimension of the female socket member and said separate female body portion having a predetermined radial dimension that is larger than the outer leading end dimension of the male plug member such that the outer leading end of the male plug member and the outer leading end of the female socket member are substantially protected from damage during use;

whereby the outer leading end of the male plug member and female socket member are protected from damage caused by bumping or dragging on the ground due to the larger separate body portions contacting the ground or other object first.

15. The coupling according to claim 7 wherein an inner stationary ring having an annular outer groove is mounted to an outer surface of the male plug member and said separate female body portion having an inner annular rib sized to mount to said annular outer groove on the inner stationary ring such that the separate female body portion can rotate around said inner stationary ring;

whereby the inner surface of the inner stationary ring is adapted to fit around any annular discontinuities on the outer surface of the male plug member and provide an outer annular groove free from discontinuities so that the separate female body portion can be manually rotated.

16. The coupling according to claim 7 wherein a smaller separate female body portion on the male plug member has a predetermined outer radial dimension that is smaller than a predetermined inner radial dimension of a larger separate male body portion on the female socket member such that said smaller separate female body portion is substantially covered by said larger separate male body portion when the coupling is in the locking position so as to provide protection for said smaller separate female body portion.

17. The coupling according to claim 7 wherein a sensor means is provided on at least one of said separate male body portion and said separate female body portion for detecting when the coupling is in the locking position and for outputting an output signal representing said locking position;

whereby a control system and valve can be signaled to allow the release and flow of a particular fluid through the coupling represented by the particular configuration of the matching protrusions and recesses.

18. A method of signaling a control system comprising:
a female socket member provided without recesses or protrusions;
a male plug member provided with a specific configuration of the recesses or protrusions according to claim 7;
a sensor means provided on said female socket member for detecting said male plug member and outputting an output signal representing said specific configuration of the recesses or protrusions.

19. A method of delivering a plurality of different fluids comprising:
providing for each fluid a respective delivery duct;
providing in each delivery duct a coupling according to claim 7;
and arranging said at least one protrusion and said at least one recess of a first one delivery duct to have a different configuration from that of a second one of the delivery ducts to prevent interchangeability of the first and second delivery ducts at the couplings.

20. The coupling according to claim 1 wherein a sensor means is provided on at least one of said male plug member and said female socket member for detecting when the coupling is in the locking position and for outputting an output signal representing said locking position;

whereby a control system and valve can be signaled to allow the release and flow of a particular fluid through the coupling represented by the particular configuration of the matching protrusions and recesses.

21. A method of signaling a control system comprising:
a female socket member provided without recesses or protrusions;
a male plug member provided with a specific configuration of the recesses or protrusions according to claim 1;
a sensor means provided on said female socket member for detecting said male plug member and outputting an output signal representing said specific configuration of the recesses or protrusions.

22. A method of delivering a plurality of different fluids comprising:
providing for each fluid a respective delivery duct;
providing in each delivery duct a coupling according to claim 1;
and arranging said at least one protrusion and said at least one recess of a first one delivery duct to have a different configuration from that of a second one of the delivery ducts to prevent interchangeability of the first and second delivery ducts at the couplings.

* * * * *